(12) United States Patent
Han et al.

(10) Patent No.: US 10,931,808 B2
(45) Date of Patent: Feb. 23, 2021

(54) TERMINAL

(71) Applicant: LG ELECTRONICS INC., Seoul (KR)

(72) Inventors: Jongwoo Han, Seoul (KR); Yoojin Park, Seoul (KR); Yoojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/608,023

(22) PCT Filed: Jul. 5, 2017

(86) PCT No.: PCT/KR2017/007126
§ 371 (c)(1),
(2) Date: Oct. 24, 2019

(87) PCT Pub. No.: WO2018/199391
PCT Pub. Date: Nov. 1, 2018

(65) Prior Publication Data
US 2020/0059548 A1   Feb. 20, 2020

(30) Foreign Application Priority Data

Apr. 24, 2017   (KR) .................. 10-2017-0052507

(51) Int. Cl.
*H04M 1/725* (2006.01)
*G06N 20/00* (2019.01)
(Continued)

(52) U.S. Cl.
CPC ...... *H04M 1/72522* (2013.01); *G06F 3/0488* (2013.01); *G06F 3/04817* (2013.01);
(Continued)

(58) Field of Classification Search
CPC ......... H04M 1/72522; H04M 2201/38; H04M 2250/06; H04M 2250/22; G06N 20/00; G06F 3/04817; G06F 3/0488; G06F 3/167
(Continued)

(56) References Cited

U.S. PATENT DOCUMENTS 6,480,885 B1 * 11/2002 Olivier ................ H04L 12/1859
709/202
8,442,973 B2 * 5/2013 Cramer ................ G06F 16/248
707/723
(Continued)

FOREIGN PATENT DOCUMENTS

KR   10-2008-0078431   8/2008
KR   10-2013-0062799   6/2013
(Continued)

OTHER PUBLICATIONS

PCT International Application No. PCT/KR2017/007126, International Search Report dated Jan. 23, 2019, 4 pages.

*Primary Examiner* — Sonny Trinh
(74) *Attorney, Agent, or Firm* — Lee, Hong, Degerman, Kang & Waimey PC

(57) ABSTRACT

A terminal is disclosed. The terminal, according to one embodiment of the present invention, comprises: a display unit for displaying an image; a control unit for controlling the display of the image; and an artificial intelligence unit for acquiring at least one conversation, acquiring at least one keyword corresponding to the at least one conversation, and controlling the control unit so as to display summary data including the at least one keyword.

15 Claims, 32 Drawing Sheets

(51) Int. Cl.
*G06F 3/0481* (2013.01)
*G06F 3/0488* (2013.01)
*G06F 3/16* (2006.01)

(52) U.S. Cl.
CPC ............ *G06F 3/167* (2013.01); *G06N 20/00* (2019.01); *H04M 2201/38* (2013.01); *H04M 2250/06* (2013.01); *H04M 2250/22* (2013.01)

(58) Field of Classification Search
USPC .......................... 455/412.1, 412.2, 466, 566
See application file for complete search history.

(56) References Cited

U.S. PATENT DOCUMENTS

| | | | | |
|---|---|---|---|---|
| 8,954,431 | B2* | 2/2015 | Okazaki | G06F 3/0488 |
| | | | | 707/732 |
| 10,235,411 | B2* | 3/2019 | Lagos | G06F 16/243 |
| 2015/0348538 | A1* | 12/2015 | Donaldson | G10L 17/22 |
| | | | | 704/235 |
| 2017/0098269 | A1 | 4/2017 | Kim | |
| 2017/0147919 | A1* | 5/2017 | Lee | G06F 16/3344 |
| 2018/0293603 | A1* | 10/2018 | Glazier | G06Q 30/0239 |
| 2020/0068135 | A1* | 2/2020 | Kang | H04N 5/23216 |
| 2020/0099634 | A1* | 3/2020 | Chou | H04L 51/18 |

FOREIGN PATENT DOCUMENTS

| | | |
|---|---|---|
| KR | 10-1594500 | 2/2016 |
| KR | 10-2016-0074954 | 6/2016 |
| KR | 10-2016-0100195 | 8/2016 |

* cited by examiner

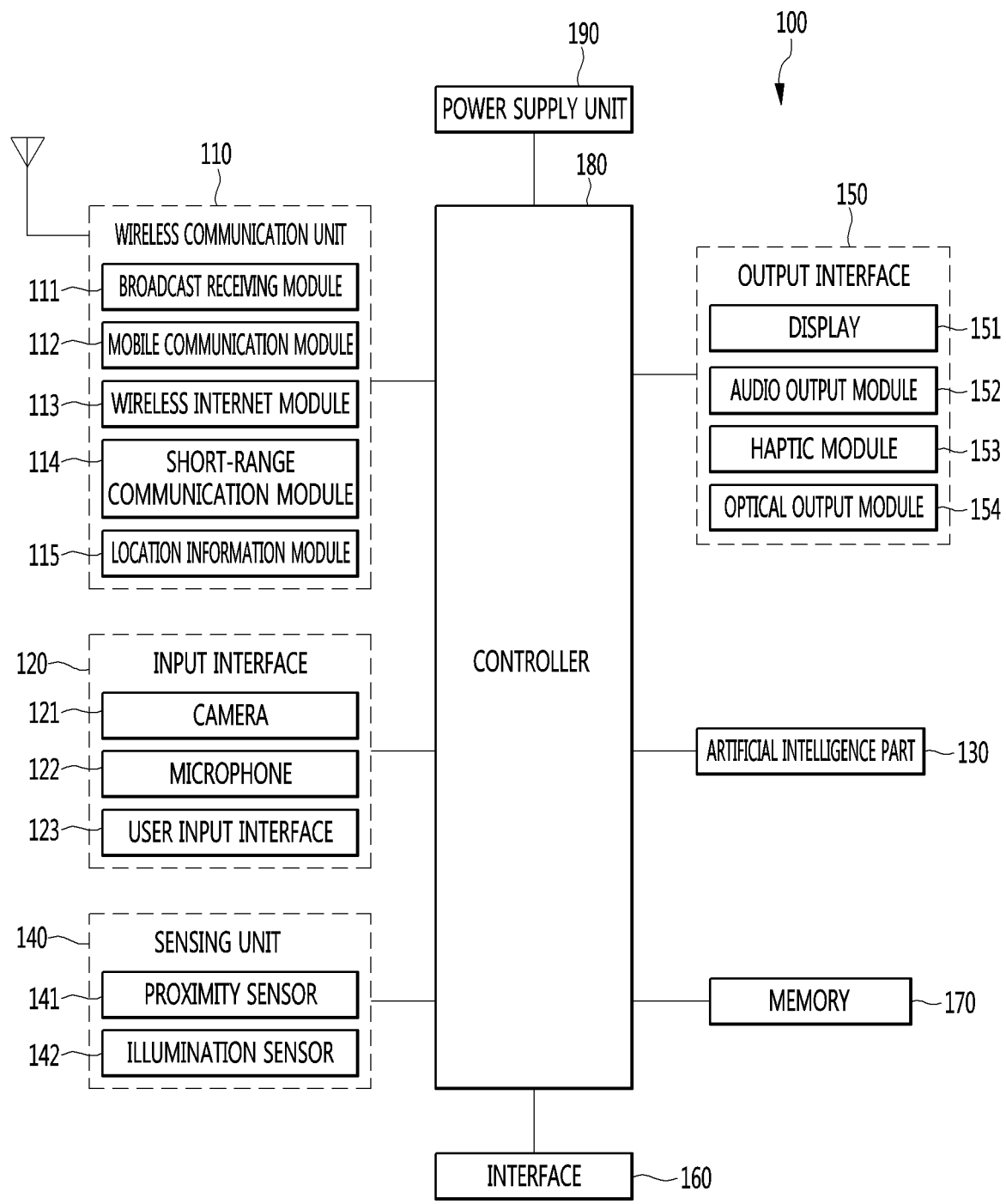

TERMINAL

CROSS-REFERENCE TO RELATED APPLICATIONS

This application is the National Stage filing under 35 U.S.C. 371 of International Application No. PCT/KR2017/007126, filed on Jul. 5, 2017, which claims the benefit of earlier filing date and right of priority to Korean Application No. 10-2017-0052507, filed on Apr. 24, 2017, the contents of which are all hereby incorporated by reference herein their entirety.

TECHNICAL FIELD

The present disclosure relates to a terminal for extracting a keyword of a chat to generate summary information and providing various services using the summary information.

BACKGROUND ART

Artificial intelligence refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into context awareness technology of recognizing a situation of a user and providing information desired by the user in a desired form using conventional AI.

The aforementioned context awareness technology has been developed, and simultaneously, demands for mobile terminals for performing functions suitable for a situation of a user have increased.

A user is capable of largely chatting using a terminal. Examples of the chatting include a chat with a user of another terminal using a messenger service or a chat with AI.

Such chats may be stored and may be provided to a user. However, when the chats accumulate, there is a problem in that it is difficult to appropriately use information due to a massive amount thereof.

DISCLOSURE

Technical Problem

An object of the present disclosure devised to solve the problem lies in a terminal for extracting a keyword of a chat, generating summary information, and providing various services using the summary information.

Technical Solution

In an aspect of the present disclosure, an operation method of a terminal may include a display configured to display an image, a controller configured to control displaying of the image, and an artificial intelligence part configured to acquire one or more chats, to acquire one or more keywords corresponding to the one or more chats, and to control the controller to display summary information including the one or more keywords.

Advantageous Effects

The present disclosure may generate and display summary information of numerous chats, thereby providing an environment for easily searching for required information, to a user.

DESCRIPTION OF DRAWINGS

FIG. 1A is a block diagram of a mobile terminal in accordance with the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1B:
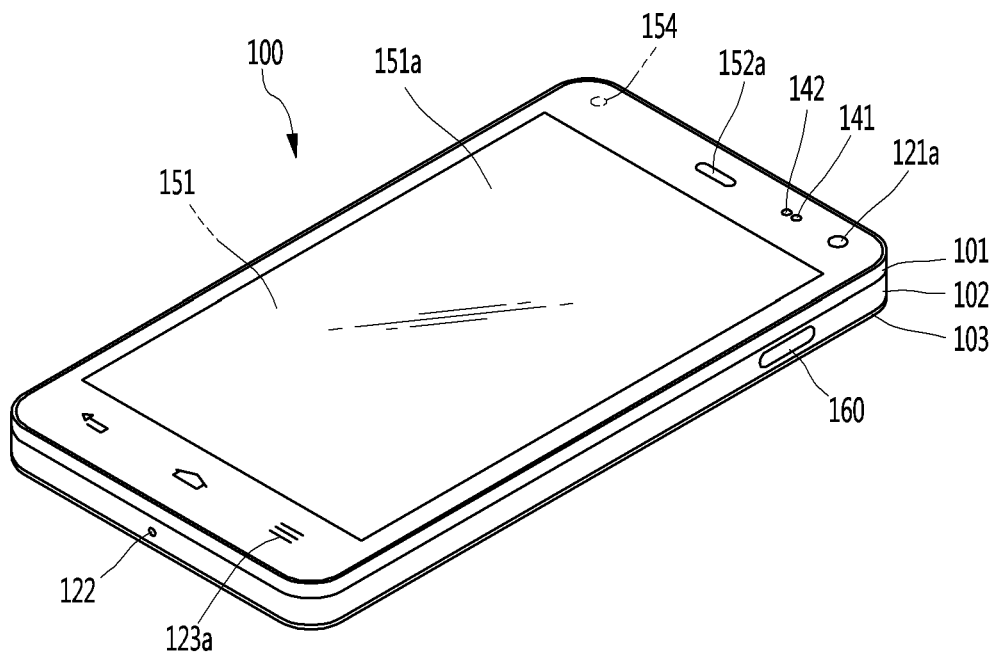
FIGS. 1B and 1C are conceptual views of one example of the mobile terminal, viewed from different directions.
Figure 1C:
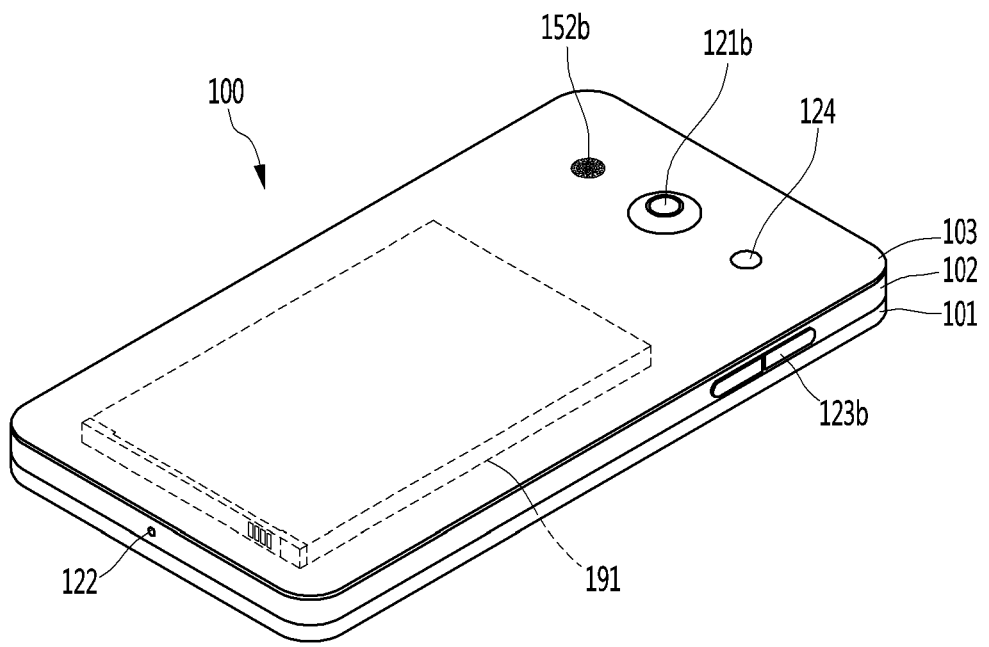

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input interface 120, a sensing unit 140, an output interface 150, an interface 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input interface 120 includes a camera 121 for obtaining images or video, a microphone 122, which is one type of audio input device for inputting an audio signal, and a user input interface 123 (for example, a touch key, a push key, a mechanical key, a soft key, and the like) for allowing a user to input information. Data (for example, audio, video, image, and the like) is obtained by the input interface 120 and may be analyzed and processed by controller 180 according to device parameters, user commands, and combinations thereof.

An artificial intelligence part 130 may process information based on artificial intelligence technology and may include one or more modules for performing at least one of information learning, information inference, information perception, or natural language processing.

The artificial intelligence part 130 may perform at least one of learning, inference, or processing on a massive amount of information (big data) such as information stored in a mobile terminal, information on an environment around the mobile terminal, or information stored in an external memory that is capable of communicating, using machine learning technology. The artificial intelligence part 130 may predict (or infer) at least one executable operation of a mobile terminal using learned information using the machine learning technology, and may control the mobile terminal to perform an operation with the highest realistic possibility among the at least one predicted operations.

The machine learning technology is technology of collecting and learning a massive amount of information and determining and predicting information based on the learned information, using at least one algorithm. The information learning is an operation of determining the property, rule, and determination reference of information, quantifying a relationship between information items, and predicting new data using the quantified pattern.

The machine learning technology may use an algorithm based on statistics, for example, a decision tree that uses a tree structure form as a predictive model, a neural network that emulates a structure and function of a neural network structure of a living organism, genetic programming based on a evolution algorithm of a living organism, clustering for distributing observed examples to subsets that are each a cluster, or a Monter carlo method of calculating a function value using probability through a random number that is arbitrarily extracted.

Deep learning technology that is one field of machine learning technology performs at least one of learning, determination, or processing of information using the neural network algorithm. The neural network may have a structure for connection between layers and transferring data between layers. The deep learning technology may learn a massive amount of information through a neural network using a graphic processing unit (GPU) that is optimized for parallel arithmetic.

The artificial intelligence part 130 may collect (percept, monitor, extract, detect, or receive) a signal, data, information, or the like, which is input or output from components of the mobile terminal in order to collect a massive amount of information for applying the machine learning technology. The artificial intelligence part 130 may collect (percept, monitor, extract, detect, or receive) data, information, or the like, which is stored in an external memory (e.g., a cloud server or a cloud server) connected via communication. In more detail, information collection may be understood to be a term including an operation of detecting information through a sensor, extracting information stored in the memory 170, or receiving information from the external memory via communication.

The artificial intelligence part 130 may detect information in the mobile terminal, information on an environment around the mobile terminal, and user information through the sensing unit 140. The artificial intelligence part 130 may receive broadcast signal, broadcast related information, wireless signal, and/or wireless data through the wireless communication unit 110. The artificial intelligence part 130 may receive image information (or a signal), audio information (or a signal), and data from an input interface, or information input from a user.

The artificial intelligence part 130 may collect a massive amount of information in real time on a background, may learn the information, and may store information (e.g., a knowledge graph, a command policy, a personalized database, a chat engine, or the like) processed in a proper form, in the memory 170.

When an operation of the mobile terminal is predicted based on learned information using the machine learning technology, the artificial intelligence part 130 may control components of the mobile terminal or may transfer a control command for executing the predicted operation to the controller 180 in order to perform the predicted operation. The controller 180 may control the mobile terminal based on the control command and may perform the predicted operation.

When a specific operation is performed, the artificial intelligence part 130 may analyze history information indicating that the specific information is performed and may update existing learned information based on the analyzed information through the machine learning technology. Thus, the artificial intelligence part 130 may increase the accuracy of predicting information.

In the specification, the artificial intelligence part 130 and the controller 180 may be understood to be the same component. In this case, the function perform by the controller 180 described in the specification may be expressed as being performed by the artificial intelligence part 130, and the controller 180 may also be referred to as the artificial intelligence part 130, or conversely, the artificial intelligence part 130 may also be referred to as the controller 180.

In contrast, in the specification, the artificial intelligence part 130 and the controller 180 may be understood to be separate components. In this case, the artificial intelligence part 130 and the controller 180 may variously perform control on the mobile terminal by exchanging data with each other. The controller 180 may perform at least one function on the mobile terminal or may control at least one of components of the mobile terminal, based on the result derived from the artificial intelligence part 130. In addition, the artificial intelligence part 130 may also be operated under control of the controller 180.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output interface 150 is typically configured to output various types of information, such as audio, video, tactile output, and the like. The output interface 150 is shown having a display 151, an audio output module 152, a haptic module 153, and an optical output module 154.

The display 151 may have an inter-layered structure or an integrated structure with a touch sensor in order to facilitate a touch screen. The touch screen may provide an output interface between the mobile terminal 100 and a user, as well as function as the user input interface 123 which provides an input interface between the mobile terminal 100 and the user.

The interface 160 serves as an interface with various types of external devices that can be coupled to the mobile terminal 100. The interface 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pregenerated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input interface 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input interface 123 is a component that permits input by a user. Such user input may enable the controller 180 to control operation of the mobile terminal 100. The user input interface 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some embodiments, the display 151 may be implemented as a stereoscopic display for displaying stereoscopic images. A typical stereoscopic display may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface 160 serves as an interface for external devices to be connected with the mobile terminal 100. For example, the interface 160 can receive data transmitted from an external device, receive power to transfer to elements and components within the mobile terminal 100, or transmit internal data of the mobile terminal 100 to such external device. The interface 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface 160.

When the mobile terminal 100 is connected with an external cradle, the interface 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof. Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display 151, a first and a second audio output modules 151a/151b, a proximity sensor 141, an illumination sensor 142, an optical output module 154, a first and a second cameras 121a/121b, a first and a second manipulation units 123a/123b, a microphone 122, interface 160 and the like.

It will be described for the mobile terminal as shown in FIGS. 1B and 1C. The display 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the displays 151 may be arranged on one side, either spaced apart from each other, or these devices may be integrated, or these devices may be arranged on different surfaces.

The display 151 may also include a touch sensor which senses a touch input received at the display. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input interface 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output interface 154 to stop the light output.

The first camera 121a can process image frames such as still or moving images obtained by the image sensor in a capture mode or a video call mode. The processed image frames can then be displayed on the display 151 or stored in the memory 170.

The first and second manipulation units 123a and 123b are examples of the user input interface 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input interface 123, a rear input interface (not shown) may be located on the rear surface of the terminal body. The rear input interface can be manipulated by a user to provide input to the mobile terminal 100. The input may be used in a variety of different ways. For example, the rear input interface may be used by the user to provide an input for power on/off, start, end, scroll, control volume level being output from the first or second audio output modules 152a or 152b, switch to a touch recognition mode of the display 151, and the like. The rear input interface may be configured to permit touch input, a push input, or combinations thereof.

The rear input interface may be located to overlap the display 151 of the front side in a thickness direction of the terminal body. As one example, the rear input interface may be located on an upper end portion of the rear side of the terminal body such that a user can easily manipulate it using a forefinger when the user grabs the terminal body with one hand. Alternatively, the rear input interface can be positioned at most any location of the rear side of the terminal body.

Embodiments that include the rear input interface may implement some or all of the functionality of the first manipulation unit 123a in the rear input interface. As such, in situations where the first manipulation unit 123a is omitted from the front side, the display 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input interface 123.

The microphone 122 is shown located at an end of the mobile terminal 100, but other locations are possible. If desired, multiple microphones may be implemented, with such an arrangement permitting the receiving of stereo sounds.

The interface 160 may serve as a path allowing the mobile terminal 100 to interface with external devices. For example, the interface 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

Figure 2:
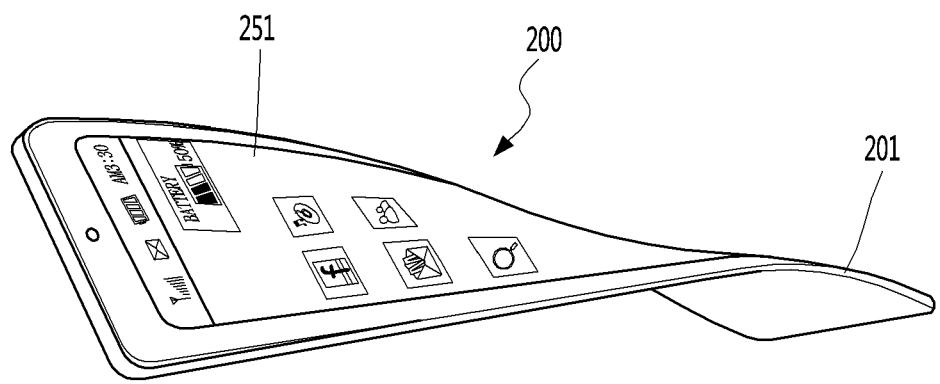
FIG. 2 is a conceptual view of a deformable mobile terminal according to an alternative embodiment of the present disclosure.

FIG. 2 is a conceptual view of a deformable mobile terminal according to an alternative embodiment of the present disclosure. In this figure, mobile terminal 200 is shown having display 251, which is a type of display that is deformable by an external force. This deformation, which includes display 251 and other components of mobile terminal 200, may include any of curving, bending, folding, twisting, rolling, and combinations thereof. The deformable display 251 may also be referred to as a "flexible display." In some implementations, the flexible display 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display 251 is not deformed (for example, in a state with an infinite radius of curvature and referred to as a first state), a display region of the flexible display 251 includes a generally flat surface. When in a state that the flexible display 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display 251 may be a curved state (for example, a state of being curved from up to down or from right to left), instead of being in flat state. In this embodiment, when an external force is applied to the flexible display 251, the flexible display 251 may transition to the second state such that the flexible display is deformed into the flat state(or a less curved state) or into a more curved state.

If desired, the flexible display 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display 251. The deformation sensor may be included in the sensing unit 140.

The deformation sensor may be located in the flexible display 251 or the case 201 to sense information related to the deforming of the flexible display 251. Examples of such information related to the deforming of the flexible display 251 may be a deformed direction, a deformed degree, a deformed position, a deformed amount of time, an acceleration that the deformed flexible display 251 is restored, and the like. Other possibilities include most any type of information which can be sensed in response to the curving of the flexible display or sensed while the flexible display 251 is transitioning into, or existing in, the first and second states.

In some embodiments, controller 180 or other component can change information displayed on the flexible display 251, or generate a control signal for controlling a function of the mobile terminal 200, based on the information related to the deforming of the flexible display 251. Such information is typically sensed by the deformation sensor.

The mobile terminal 200 is shown having a case 201 for accommodating the flexible display 251. The case 201 can be deformable together with the flexible display 251, taking into account the characteristics of the flexible display 251.

A battery (not shown in this figure) located in the mobile terminal 200 may also be deformable in cooperation with the flexible display 261, taking into account the characteristic of the flexible display 251. One technique to implement such a battery is to use a stack and folding method of stacking battery cells.

The deformation of the flexible display 251 not limited to perform by an external force. For example, the flexible display 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
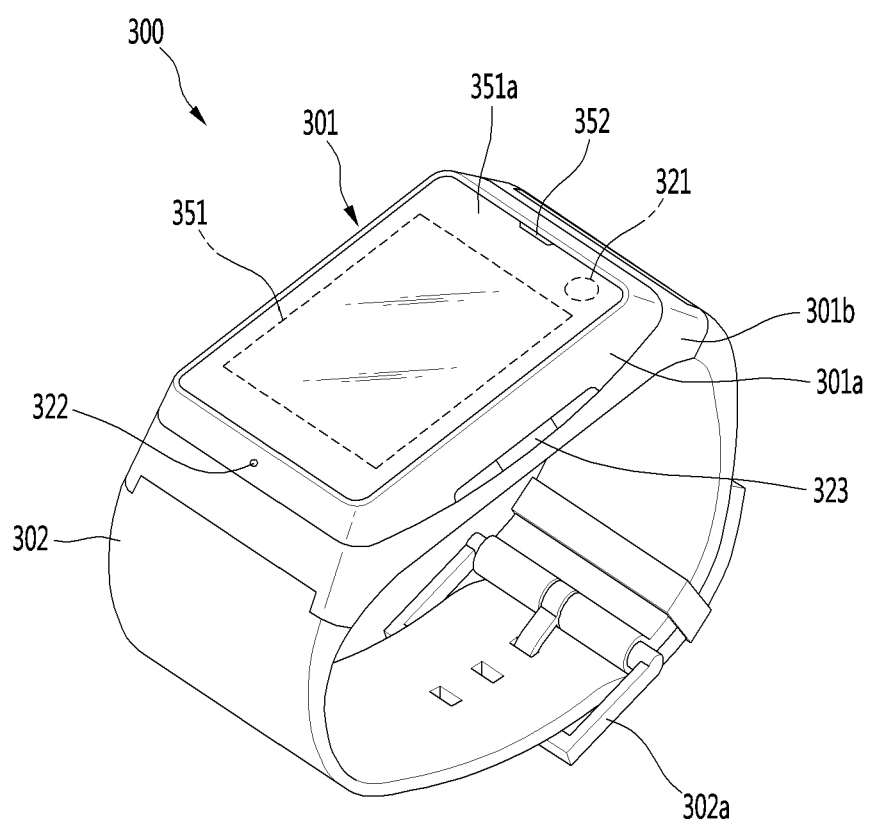
FIG. 3 is a perspective view illustrating one example of a watch-type mobile terminal in accordance with another exemplary embodiment.

FIG. 3 is a perspective view illustrating one example of a watch-type mobile terminal 300 in accordance with another exemplary embodiment. As illustrated in FIG. 3, the watch-type mobile terminal 300 includes a main body 301 with a display 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display 351 is shown located at the front side of the main body 301 so that displayed information is viewable to a user. In some embodiments, the display 351 includes a touch sensor so that the display can function as a touch screen. As illustrated, window 351a is positioned on the first case 301a to form a front surface of the terminal body together with the first case 301a.

The illustrated embodiment includes audio output module 352, a camera 321, a microphone 322, and a user input interface 323 positioned on the main body 301. When the display 351 is implemented as a touch screen, additional function keys may be minimized or eliminated. For example, when the touch screen is implemented, the user input interface 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
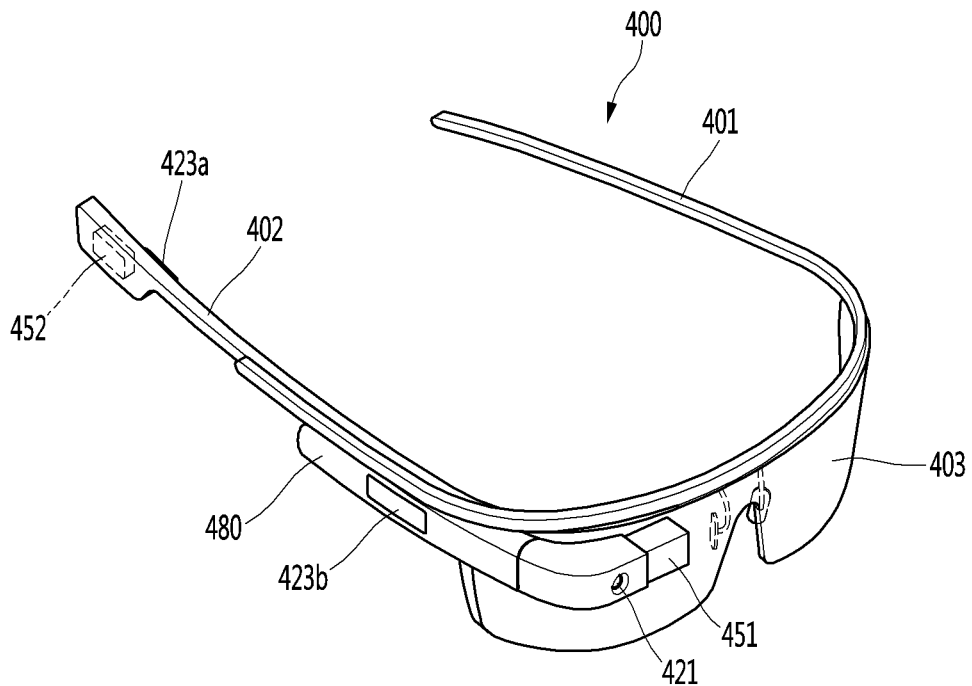
FIG. 4 is a perspective view illustrating one example of a glass-type mobile terminal according to another exemplary embodiment.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display 451 may be located to correspond to either or both of the left and right eyes. FIG. 4 illustrates that the display 451 is located on a portion corresponding to the right eye to output an image viewable by the user's right eye.

The display 451 may project an image into the user's eye using a prism. Also, the prism may be formed from optically transparent material such that the user can view both the projected image and a general visual field (a range that the user views through the eyes) in front of the user.

In such a manner, the image output through the display 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input interfaces 423a and 423b, which can each be manipulated by the user to provide an input. The user input interfaces 423a and 423b may employ techniques which permit input via a tactile input. Typical tactile inputs include a touch, push, or the like. The user input interfaces 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB(Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P(Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the specification, the term 'the memory 170' may be interchangeably used with the term 'the memory 170'.

The controller 180 may control an operation of each component of the mobile terminal 100 under control of the artificial intelligence part 130.

The input interface 120 of the mobile terminal 100 may include the sensing unit 140 and may perform all functions performed by the sensing unit 140. For example, the input interface 120 may detect user touch input.

Hereinafter, an embodiment of the present disclosure will be described with regard to an example of a mobile terminal. However, the present disclosure is not limited thereto, and the present disclosure may be applied to any terminal or electronic device with an artificial intelligence function installed therein.

Figure 5:
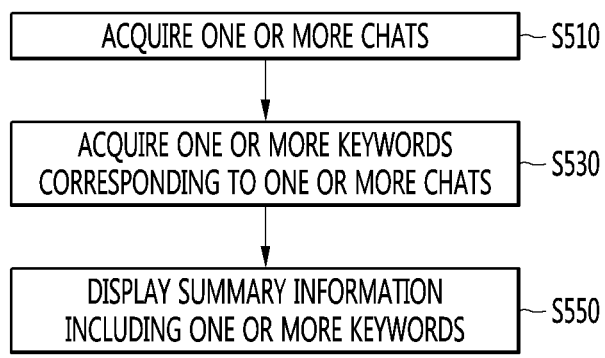
FIG. 5 is a flowchart for explanation of a method of an operation method of a mobile terminal according to an embodiment of the present disclosure.

FIG. 5 is a flowchart for explanation of a method of an operation method of a mobile terminal according to an embodiment of the present disclosure.

The operation method of the mobile terminal according to an embodiment of the present disclosure may include acquiring one or more chats (S510), acquiring one or more keywords corresponding to the one or more chats (S530), and displaying summary information including the one or more keywords (S550).

A method of acquiring one or more chats will be described in detail with reference to FIG. 6.

Figure 6:
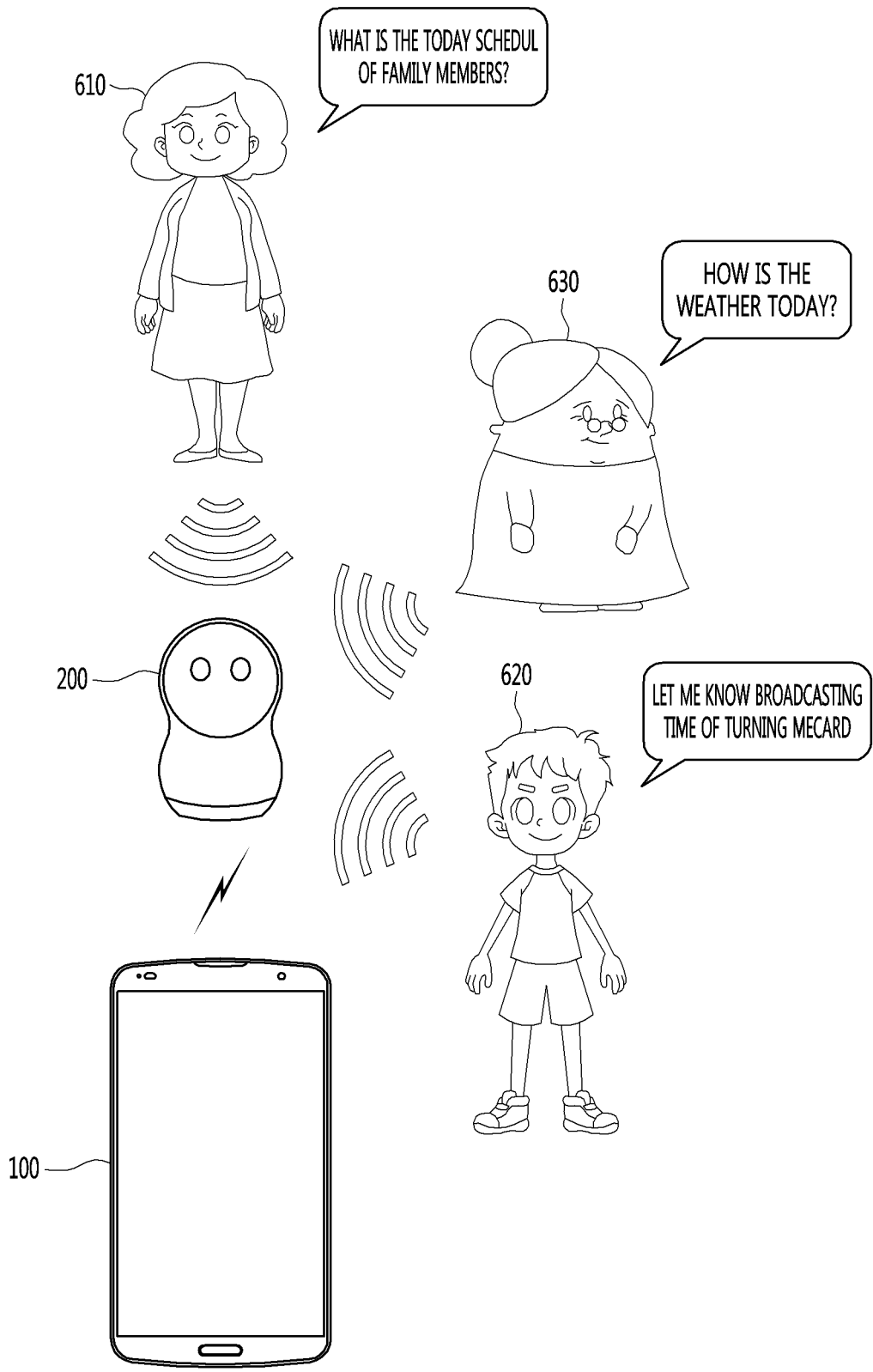
FIGS. 6 and 7 are diagrams for explanation of a method of acquiring one or more chats according to an embodiment of the present disclosure.
Figure 7:
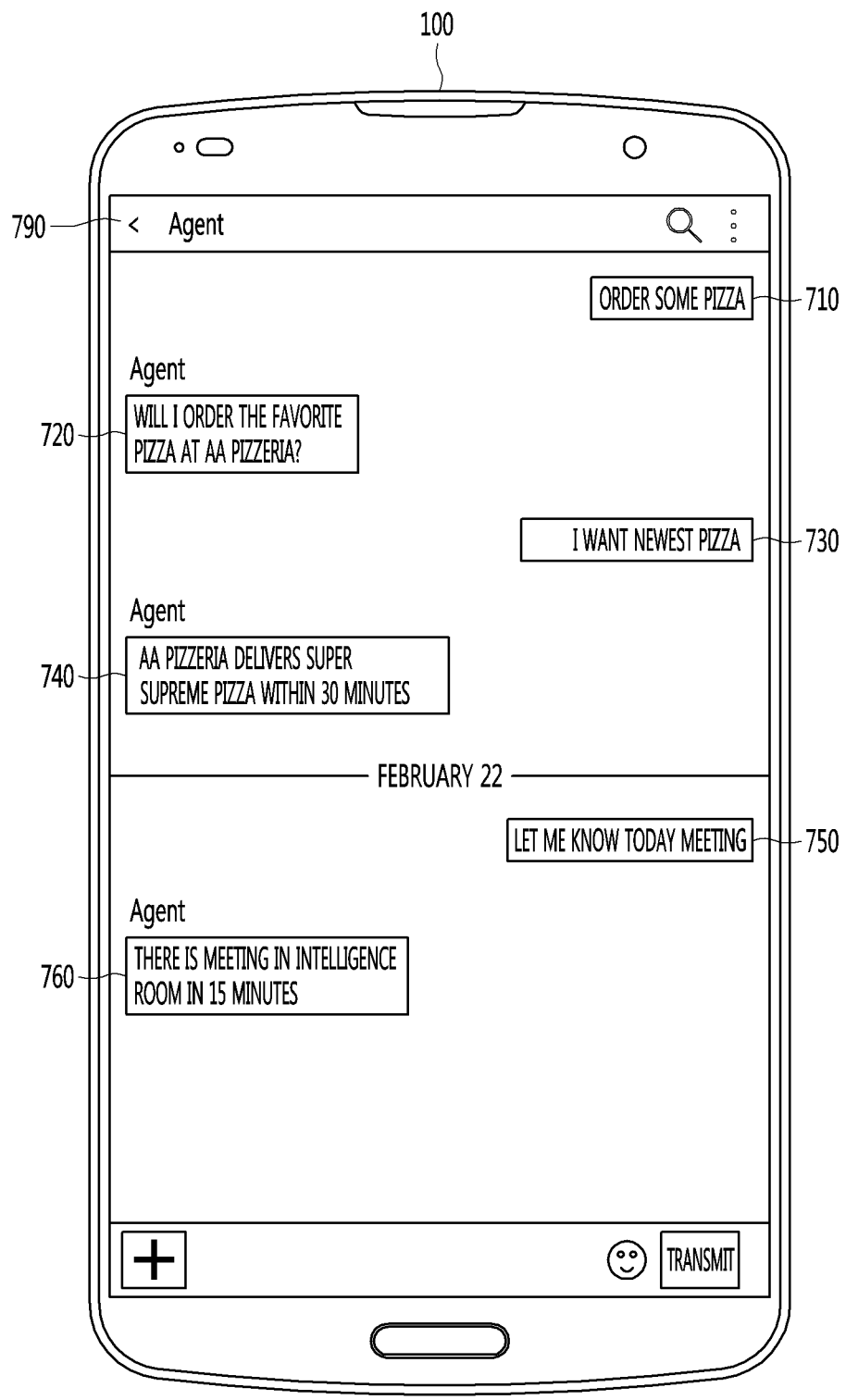

FIGS. 6 and 7 are diagrams for explanation of a method of acquiring one or more chats according to an embodiment of the present disclosure.

The mobile terminal 100 and an input and output device 200 may configure a service providing system using artificial intelligence.

A user may chat with an artificial intelligence agent, and thus may receive various services from artificial intelligence.

Here, the artificial intelligence agent may refer to an application program that performs an autonomous process on behalf of a user for a specific purpose.

In this case, the artificial intelligence part 130 may process the application program of the artificial intelligence agent and may perform a function or an operation.

A chat between the user and the artificial intelligence agent may include a chat made by the user to the artificial intelligence agent and a chat made by the artificial intelligence agent to the user.

The input and output device 200 may receive the chat made by the user to the artificial intelligence agent.

For example, a plurality of users 610, 620, and 630 may make a chat in the form of voice, and in this case, a chat made by the plurality of users 610, 620, and 630 may correspond to voice input and may be received by the input and output device 200.

The input and output device 200 may transmit a signal corresponding to the received voice input to the mobile terminal 100. Accordingly, the voice input of the user may be transferred to the artificial intelligence part 130 of the mobile terminal 100.

The artificial intelligence part 130 may perform a function or operation corresponding to input of the user.

The artificial intelligence part 130 may output a chat made by the artificial intelligence part 130 to the user.

The chat made by the artificial intelligence part 130 to the user may be output using various methods.

In detail, the artificial intelligence part 130 may control the controller 180 to display the chat made by the user through the display 151.

The artificial intelligence part 130 may control the controller 180 to output the chat to the user in the form of voice through the audio output module 152.

The artificial intelligence part 130 may transmit a signal corresponding to the chat to the user to the input and output device 200. In this case, the input and output device 200 may output the chat to the user in the form of voice or an image.

Such various output methods may be combined. For example, the chat to the user may be output in the form of voice from the input and output device 200, and simultaneously, may also be displayed on the display 151 of the mobile terminal 100.

According to the present embodiment, the case in which a chat is input through the input and output device 200 is described, but the present disclosure is not limited thereto.

For example, the plurality of users 610, 620, and 630 may make a chat in the form of voice, and in this case, the chat made by the plurality of users 610, 620, and 630 may be voice input and may be received through the input interface 120. In addition, the artificial intelligence agent may display the chat to the user in the form of an image through the display 151 or may output the chat to the user in the form of voice through the audio output module 152. That is, according to the present disclosure, the chat to the user may be embodied alone by the mobile terminal 100.

Although the case in which a user makes a chat to the artificial intelligence agent in the form of voice has been described, the present disclosure is not limited thereto and any method of transferring a chat may be used. For example, the user may make a chat to the artificial intelligence agent in the form of text input. In this case, the input and output device 200 or the input interface 120 may transmit a signal corresponding to the chat made by the user to the artificial intelligence part 130.

The artificial intelligence part 130 may acquire one or more chats.

In detail, the input and output device 200 may receive the chat made by the user and may transmit a signal corresponding to the received input to the mobile terminal 100, and the wireless communication unit 110 may transmit the signal to the artificial intelligence part 130. When the chat made by the plurality of users 610, 620, and 630 is received by the mobile terminal 100, the signal corresponding to the received input may be transferred to the artificial intelligence part 130. In addition, the artificial intelligence part 130 may generate the chat to the user, and in this case, the artificial intelligence part 130 may acquire the generated chat as one or more chats.

FIG. 7 is a diagram showing one or more chats 710, 720, 730, 740, 750, and 760.

Here, the one or more chats 710, 720, 730, 740, 750, and 760 may include chats 710, 730, and 750 made to the artificial intelligence agent by the user, and chats 720, 740, and 760 made to the user by the artificial intelligence agent.

The artificial intelligence part 130 may store the one or more chats 710, 720, 730, 740, 750, and 760 in the memory 170.

The artificial intelligence part 130 may display the one or more chats 710, 720, 730, 740, 750, and 760 on a chat window 790 of a messenger service, as a chat performed in the messenger service.

Although FIG. 6 illustrates a service providing system that uses artificial intelligence and includes the input and output device 200 and the mobile terminal 100 has been described, hereinafter, the mobile terminal 100 is assumed to perform an operation alone, according to an embodiment of the present disclosure. For example, it is assumed that the mobile terminal 100 directly receives the chat made by the user, the artificial intelligence part 130 performs a function or an operation corresponding to the chat made by the user, and the mobile terminal 100 directly outputs the chat made by the artificial intelligence part 130.

However, the present disclosure is not limited thereto, and as described above with reference to FIG. 6, it is obvious to one of ordinary skill in the art that a chat is input/output by the input and output device 200.

According to the present disclosure, the input and output device 200 may be embodied alone. For example, the input and output device 200 may be an artificial intelligence device for providing an artificial intelligence service to family members in houses. The artificial intelligence device may include all or some of the aforementioned components of the mobile terminal 100 and may perform all or some of the aforementioned functions of the mobile terminal 100. Accordingly, the artificial intelligence device may directly receive the chat made by the user, may directly perform a function or operation corresponding to the chat made by the user, and may directly output the chat made by the artificial intelligence device.

In this case, a chat may also be input/output by the mobile terminal 100. For example, the mobile terminal 100 may receive the chat made by the user and may transmit the chat to the artificial intelligence device. In this case, the artificial intelligence device may perform the function or operation corresponding to the chat made by the user. The artificial intelligence device may transmit a chat made by the artificial intelligence device to the mobile terminal 100, and the mobile terminal 100 may output the chat to the user by the artificial intelligence device in the form of voice or an image.

FIGS. 6 and 7 illustrate the case in which the chat made by the user to the artificial intelligence agent and the chat to the user by the artificial intelligence agent are acquired as one or more chats.

However, the present disclosure is not limited thereto, and the artificial intelligence part 130 may acquire, as a chat, information provided when an application is driven.

This will be described in detail with reference to FIG. 8.

FIG. 8 is a diagram for explanation of a method of acquiring a chat according to another embodiment of the present disclosure.

The artificial intelligence part 130 may acquire, as a chat, information provided to the user when an application is driven, and may store the acquired chat in the memory 170. The controller 180 may control the display 151 to display the acquired chat under control of the artificial intelligence part 130.

Figure 8A:
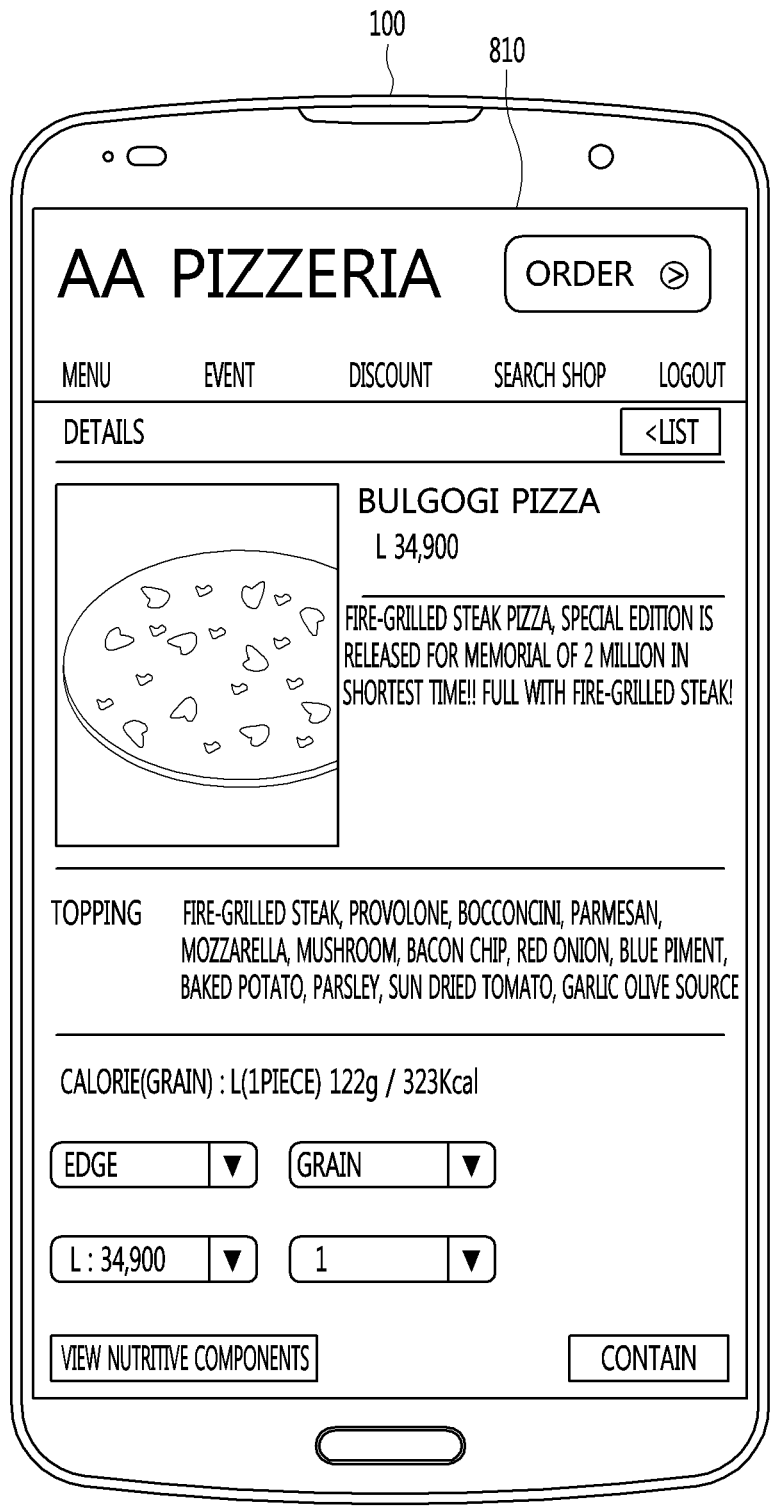
FIGS. 8A-8C are diagrams for explanation of a method of acquiring a chat according to another embodiment of the present disclosure.

For example, referring to FIG. 8A, a pizza ordering application is driven, and information such as "AA pizzeria", "Bulgogi pizza", or "pizza ordering" is provided to the user. In this case, the artificial intelligence part 130 may acquire, as a chat, the information such as "AA pizzeria", "Bulgogi pizza", or "pizza ordering", and as shown in FIG. 8C, an acquired first chat 910 may be displayed.

Figure 8B:
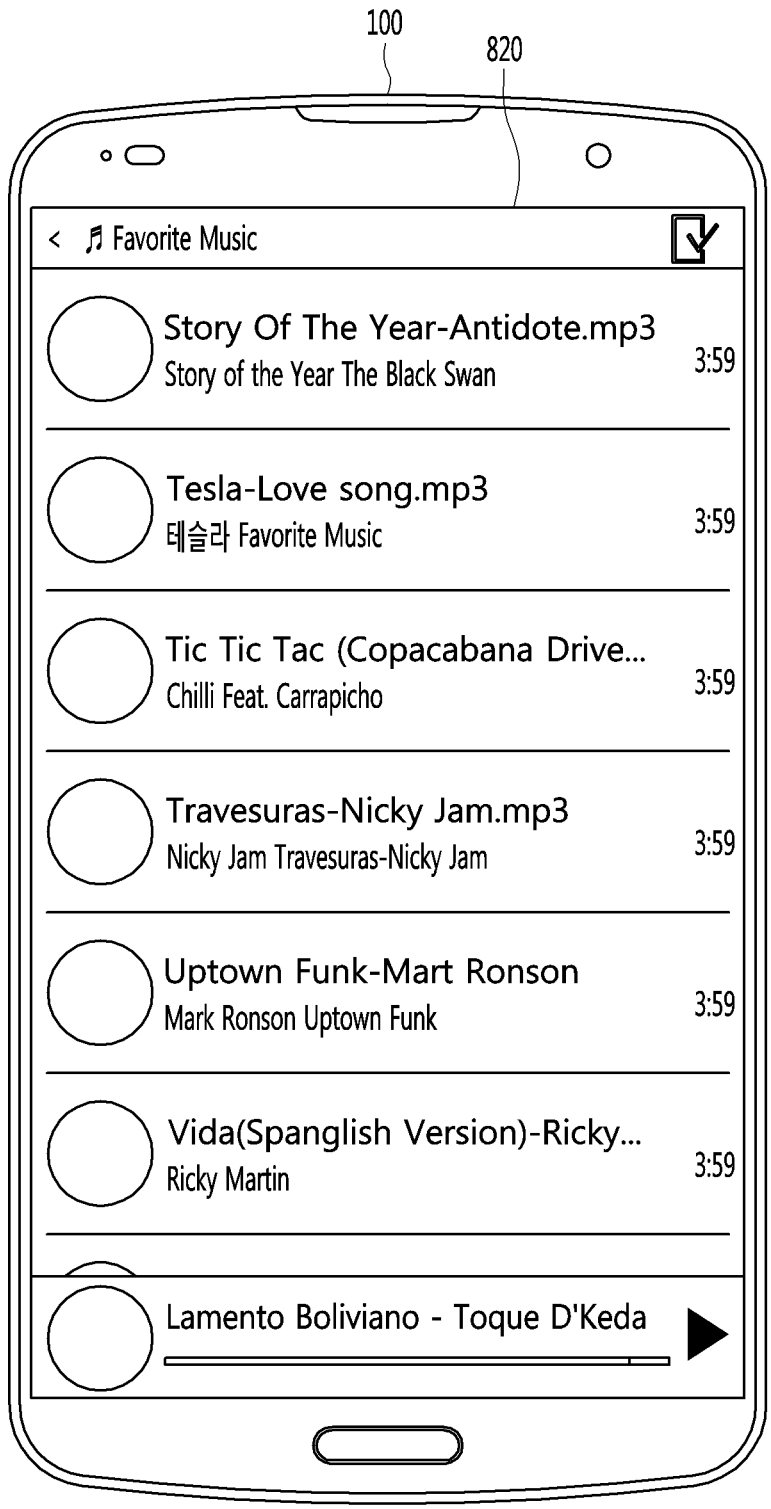
Figure 8C:
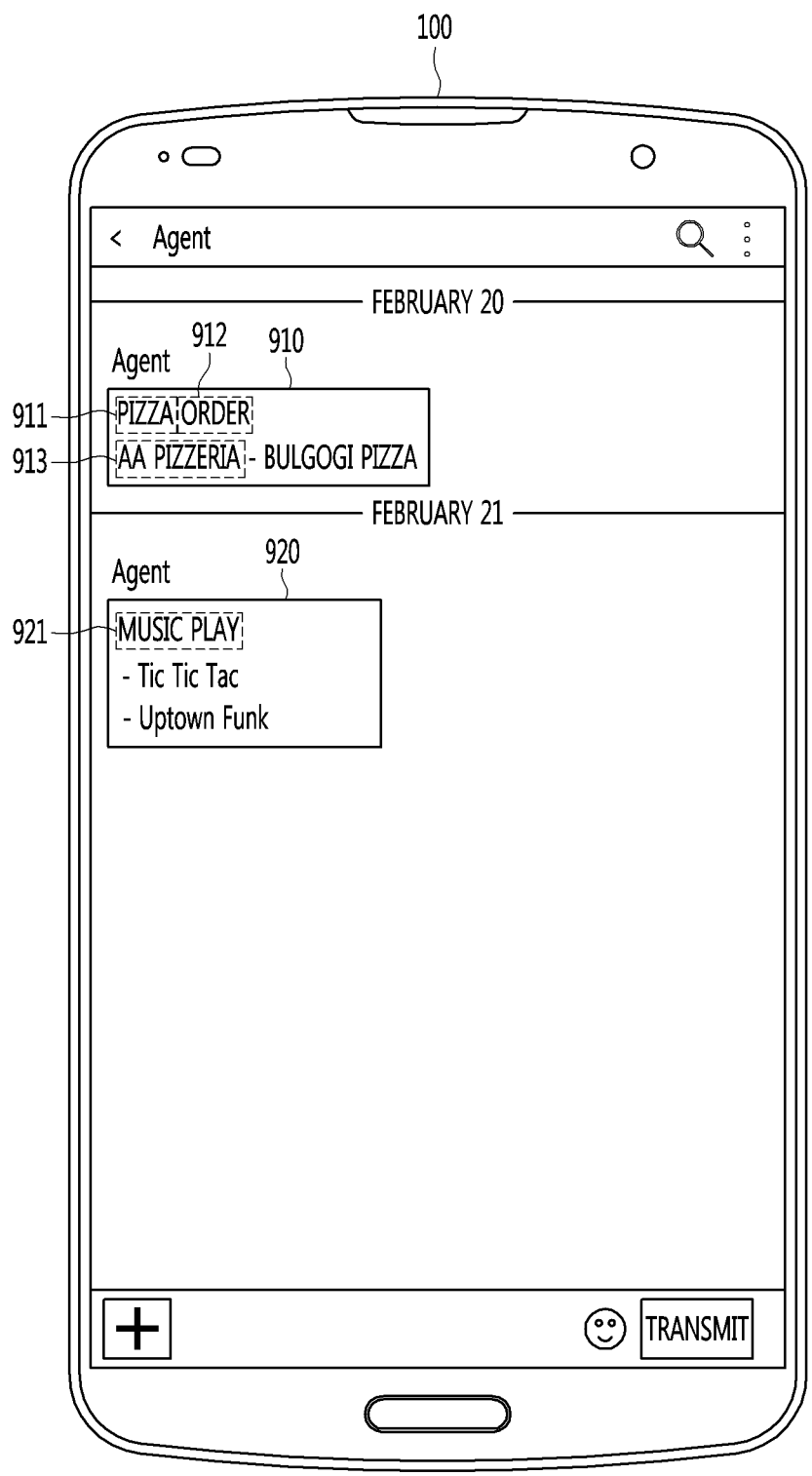

In another example, referring to FIG. 8B, a music play application is driven, and information on a title of a played song such as "Tic Tic Tic" or "Uptown Funk" is provided to the user. In this case, the artificial intelligence part 130 may acquire, as a chat, the information on the title of the played song such as "Tic Tic Tic" or "Uptown Funk", and as shown in FIG. 8C, an acquired second chat 920 may be displayed.

One or more chats may be displayed by a single chat window, which will be described in detail with reference to FIG. 9.

Figure 9:
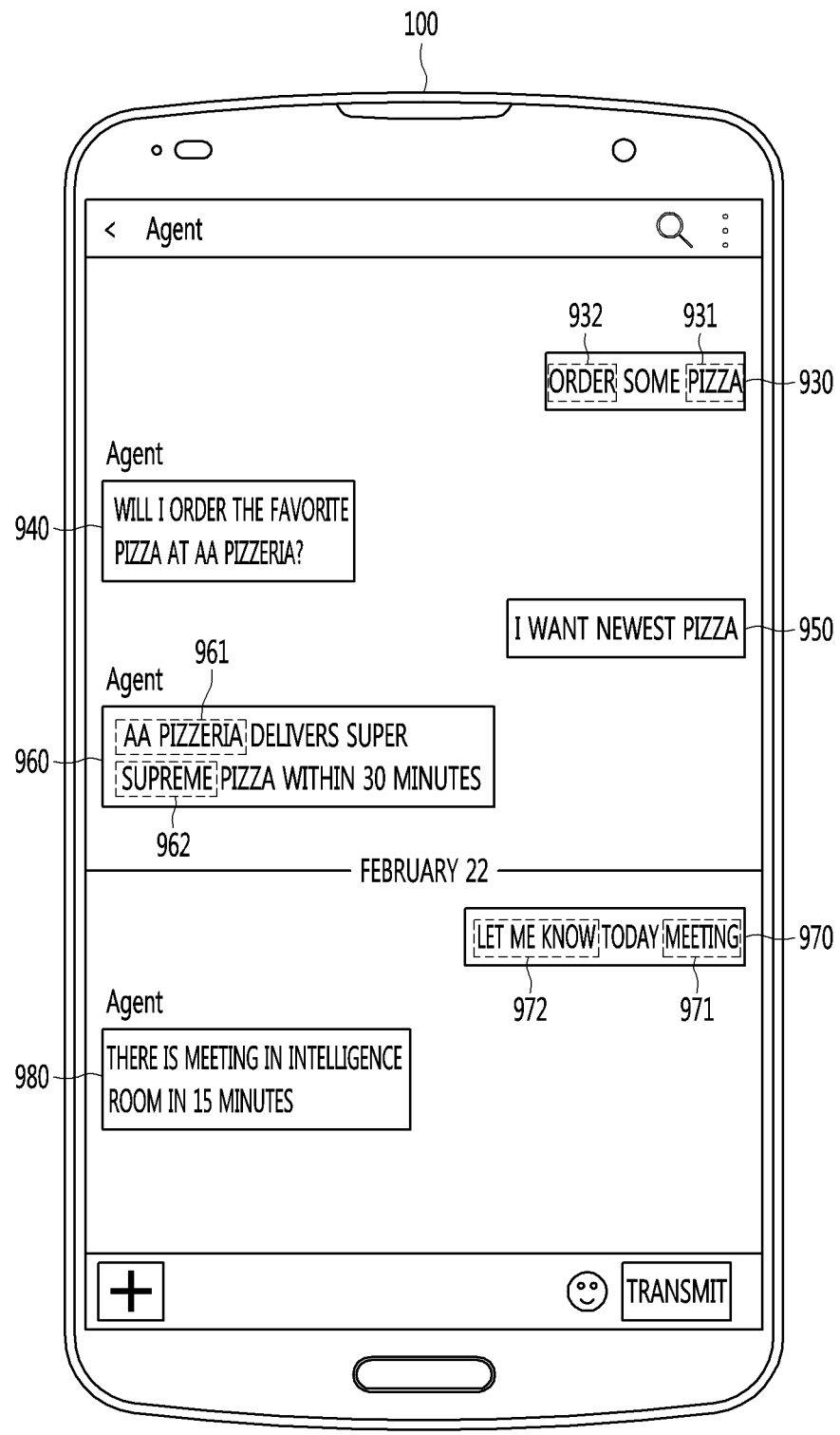
FIG. 9 is a diagram showing one or more chats displayed by a chat window, according to an embodiment of the present disclosure.

FIG. 9 is a diagram showing one or more chats displayed by a chat window, according to an embodiment of the present disclosure.

Under control of the artificial intelligence part 130, the controller 180 may display one or more chats on the chat window. For example, under control of the artificial intelligence part 130, the controller 180 may display third to eighth chats 930, 940, 950, 960, 970, and 980 on a chat window. Here, the chat window may be a chat window of a messenger service.

One or more chats may be displayed on a single chat window, and as input for scrolling the chat window is received, a previous chat or a next chat may be displayed. For example, an upon receiving input for scrolling the chat window, the controller 180 may display first to second chats under control of the artificial intelligence part 130.

Figure 10:
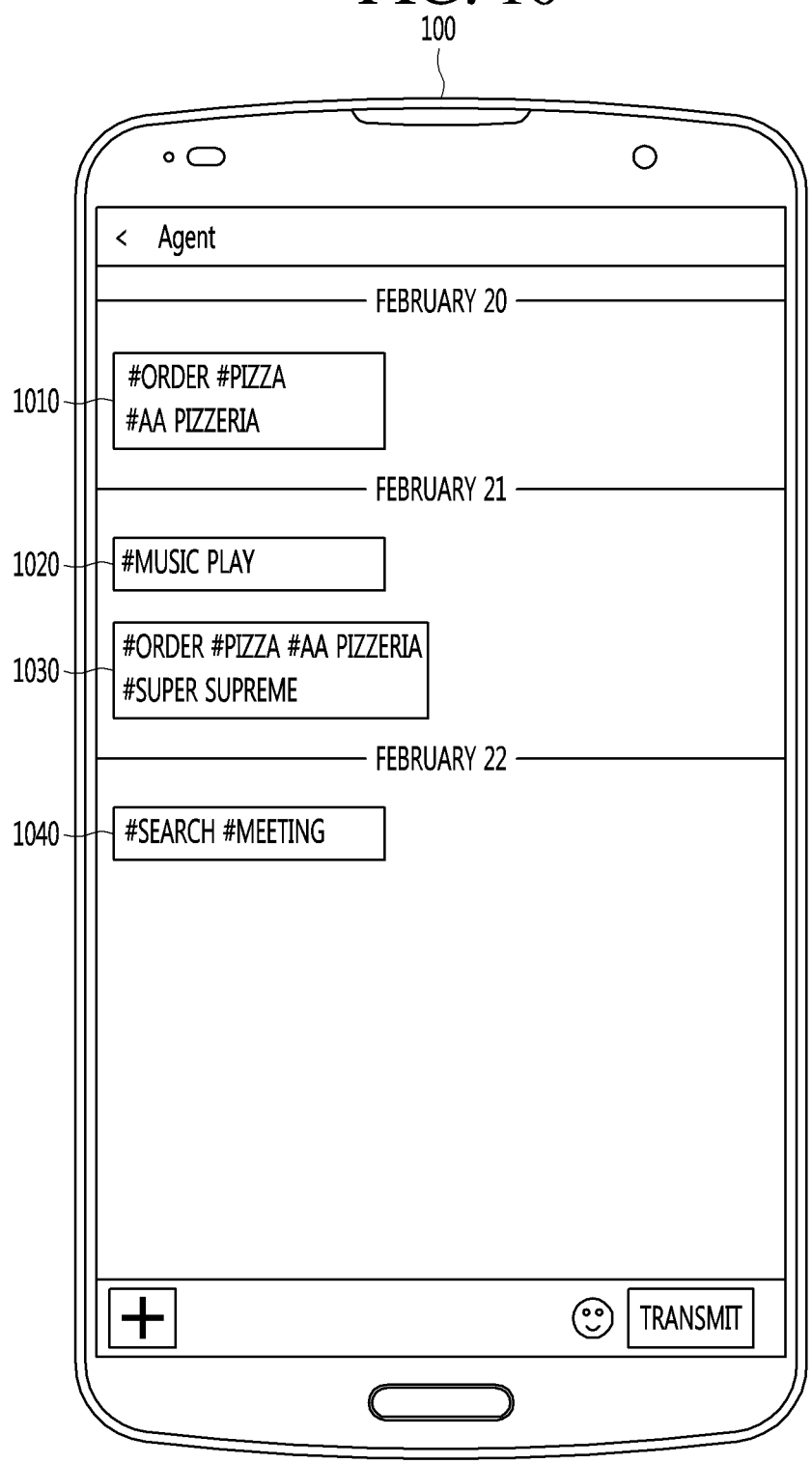
FIG. 10 is a diagram for explaining a method of acquiring a keyword and displaying summary information including the keyword according to an embodiment of the present disclosure.

FIG. 10 is a diagram for explaining a method of acquiring a keyword and displaying summary information including the keyword according to an embodiment of the present disclosure.

The present disclosure will be described with reference to FIGS. 8 and 9 in addition to FIG. 10.

The artificial intelligence part 130 may acquire one or more keywords corresponding to one or more chats.

In detail, referring to FIG. 8C, the artificial intelligence part 130 may classify the first chat 910 as a first theme, and may acquire one or more keywords corresponding to the first chat 910.

Referring to FIG. 8C, the artificial intelligence part 130 may classify the second chat 920 as a second theme, and may acquire one or more keywords corresponding to the second chat 920.

Referring to FIG. 9, the artificial intelligence part 130 may classify the third to sixth chats 930, 940, 950, and 960 as a third theme, and may acquire one or more keywords corresponding to the third to sixth chats 930, 940, 950, and 960.

Referring to FIG. 9, the artificial intelligence part 130 may classify the seventh and eighth chats 970 and 980 as a fourth theme, and may acquire one or more keywords corresponding to the seventh and eighth chats 970 and 980.

The artificial intelligence part 130 may classify the plurality of chats 910, 920, 930, 940, 950, and 960 as a plurality of themes based on a time interval.

For example, when a time interval between the third chat 930 and the fourth chat 940, a time interval between the fourth chat 940 and the fifth chat 950, and a time interval between the fifth chat 950 and the sixth chat 960 are less than a preset value, a time interval between the sixth chat 960 and the seventh chat 970 is greater than a preset value, and a time interval between the seventh chat 970 and the eighth chat 980 is less than a preset value, the artificial intelligence part 130 may classify the third to sixth chats 930, 940, 950, and 960 as one theme and may classify the seventh and eighth chats 970 and 980 as another theme.

Although the case in which the artificial intelligence part 130 classifies one or more chats as a plurality of themes based on a time interval has been described, the present disclosure is not limited thereto.

In detail, the artificial intelligence part 130 may classify one or more chats as a plurality of themes based on content of the chats.

For example, the artificial intelligence part 130 may classify chats including content such as a pizza, a name related thereto (AA pizzeria, supreme pizza, or the like), or the like as one theme among a plurality of chats. In this case, the AA pizzeria, the supreme pizza, or the like may be learned as a name related to a pizza using a machine learning algorithm.

The artificial intelligence part 130 may classify one or more chats as a plurality of themes based on at least one of a time interval and content of a chat.

The artificial intelligence part 130 may acquire one or more keywords corresponding to one or more chats. Here, the one or more chats may be chats classified as the same theme among the plurality of chats 910, 920, 930, 940, 950, and 960.

For example, the artificial intelligence part 130 may acquire one or more keywords corresponding to the third to sixth chats 930, 940, 950, and 960 classified as the third theme.

In another example, the artificial intelligence part 130 may acquire one or more keywords corresponding to the seventh and eighth chats 970 and 980 classified as the fourth theme.

The artificial intelligence part 130 may acquire words included in at least one chat as one or more keywords among one or more chats and may acquire summary information including one or more keywords. The controller 180 may control the display 151 to display the acquired summary information under control of the artificial intelligence part 130.

For example, referring to FIG. 8C, one or more chats 910 classified as the first theme may include a first word 911, a second word 912, and a third word 913. In this case, the artificial intelligence part 130 may acquire the first word 911, the second word 912, and the third word 913 as one or more keywords. The controller 180 may display summary information 1010 including the acquired one or more keywords.

In another example, referring to FIG. 8C, one or more chats 920 classified as the second theme may include a fourth word 921. In this case, the artificial intelligence part 130 may acquire the fourth word 921 as one or more keywords. In addition, the controller 180 may display summary information 1020 including the acquired one or more keywords.

In another example, referring to FIG. 9, the one or more chats 930, 940, 950, and 960 classified as the third theme may include a fifth word 931, a sixth word 932, a seventh word 961, and an eighth word 962. In this case, the artificial intelligence part 130 may acquire the fifth word 931, the sixth word 932, the seventh word 961, and the eighth word 962 as one or more keywords. The controller 180 may display summary information 1030 including the one or more acquired keywords.

In another example, referring to FIG. 9, one or more chats 970 and 980 classified as the fourth theme may include a ninth word 971 and a tenth word 972. In this case, the artificial intelligence part 130 may acquire the ninth word 971, the tenth word 972 as one or more keywords. In addition, the controller 180 may display summary information 1040 including the one or more acquired keywords.

The artificial intelligence part 130 may select, as a keyword, some of a plurality of words included in one or more chats, based on information learned using a machine learning function. According to another embodiment, the artificial intelligence part 130 may select, as a keyword, a noun among a plurality of words included in one or more chats.

Figure 11:
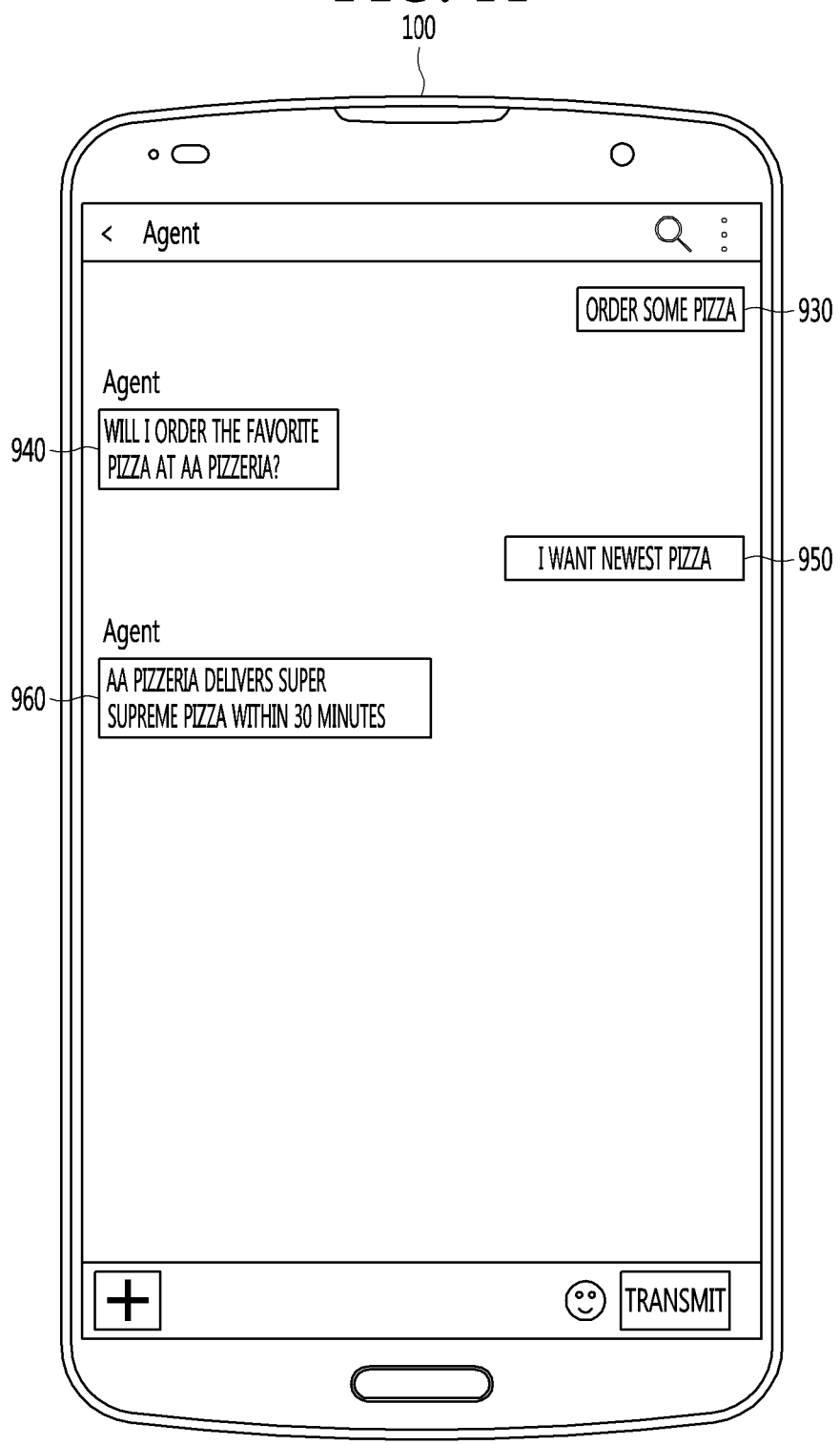
FIG. 11 is a diagram for explaining a method of displaying a plurality of chats according to an embodiment of the present disclosure.

FIG. 11 is a diagram for explaining a method of displaying a plurality of chats according to an embodiment of the present disclosure.

The present disclosure will be described with reference to FIG. 10 in addition to FIG. 11.

The controller 180 may display a plurality of pieces of summary information 1010, 1020, 1030, and 1040 under control of the artificial intelligence part 130.

In the state in which the plurality of pieces of summary information 1010, 1020, 1030, and 1040 are displayed, input for selecting the third summary information 1030 may be received through the input interface 120.

In this case, the artificial intelligence part 130 may acquire one or more chats corresponding to the third summary information 1030. The controller 180 may display the one or more chats 930, 940, 950, and 960 corresponding to the third summary information 1030.

For example, when one or more keywords corresponding to the one or more chats 930, 940, 950, and 960 classified as the third theme are acquired and the third summary information 1030 including the one or more keywords is displayed, if the third summary information 1030 is selected, the controller 180 may display the one or more chats 930, 940, 950, and 960 classified as the third theme.

As such, according to the present disclosure, summary information of numerous chats may be generated and displayed, thereby providing an environment for easily searching for required information, to a user.

In particular, words that are frequently used by the user may be generated as a keyword. Thus, when the user searches for information, the accuracy of searching may be advantageously improved.

The keyword may include a speaker of the chat, which will be described in detail with reference to FIG. 12.

Figure 12:
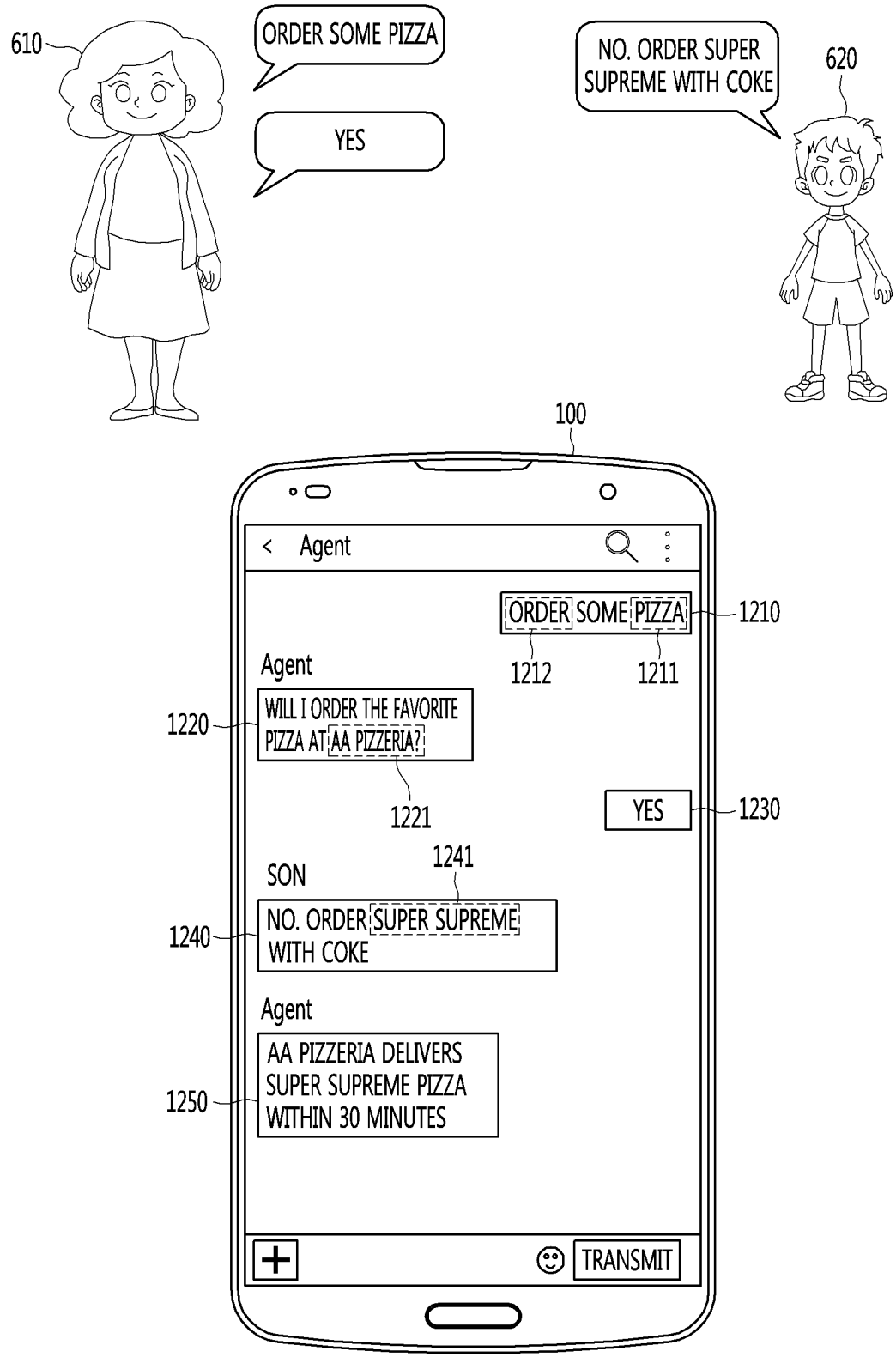
FIGS. 12 and 13 are diagrams for explaining a method of acquiring, as a keyword, a word included in a chat and a speaker of the chat according to an embodiment of the present disclosure.
Figure 13:
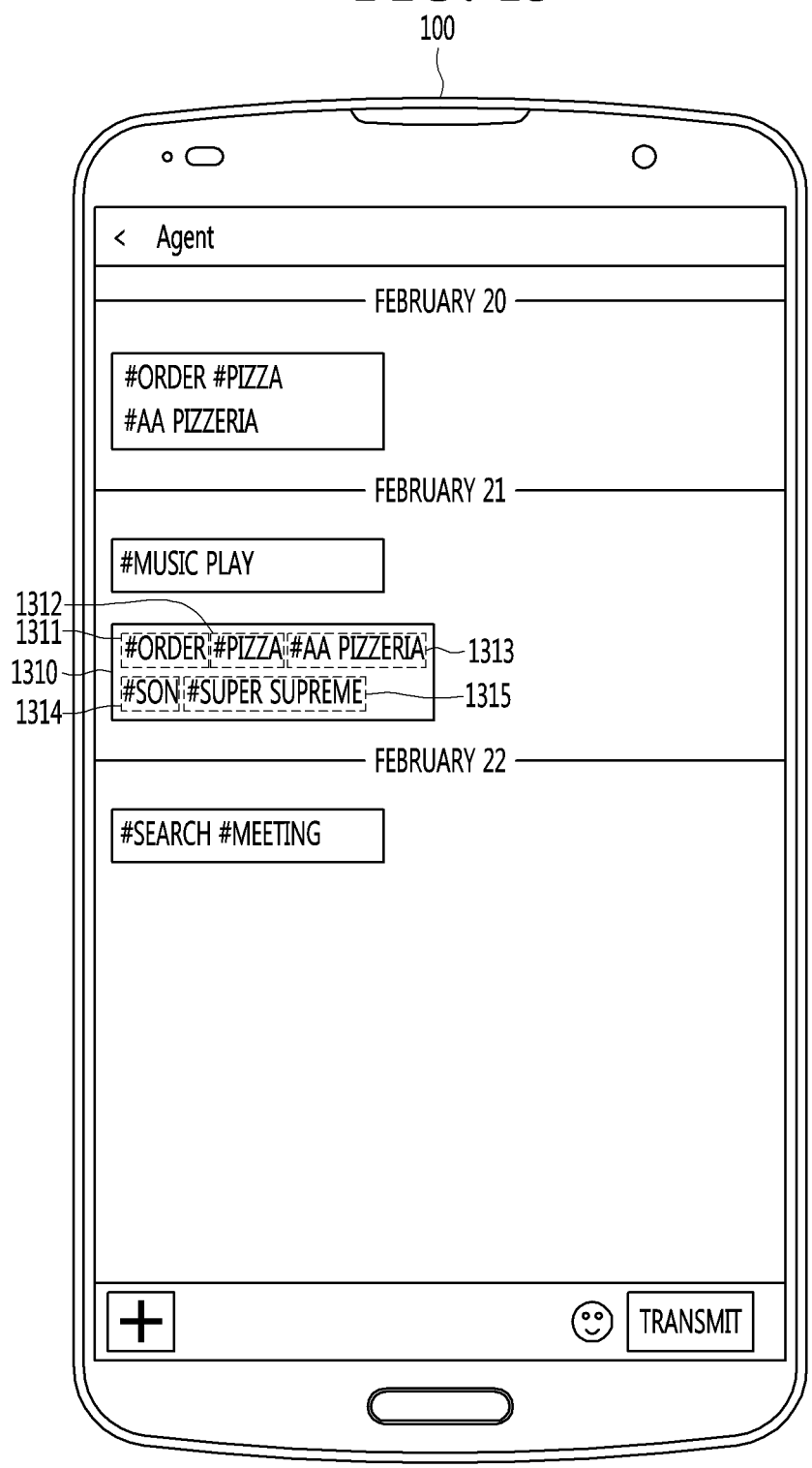

FIGS. 12 and 13 are diagrams for explaining a method of acquiring, as a keyword, a word included in a chat and a speaker of the chat according to an embodiment of the present disclosure.

The artificial intelligence agent may make a chat to a plurality of users 610 and 620. For example, the artificial intelligence agent may perform a chat between a mother and son at home and may provide a service to them.

Upon acquiring a chat, the artificial intelligence part 130 may identify a speaker of the chat.

For example, upon receiving the chat in the form of voice input, the artificial intelligence part 130 may identify a speaker of the chat based on the properties of voice.

In another example, a plurality of users may make a chat to the artificial intelligence agent using mobile terminals owned by the users. In this case, when a first chat of a first user is input to a mobile terminal of the first user and is transmitted to the mobile terminal 100, and a second chat of a second user is input to a mobile terminal of the second user is transmitted to the mobile terminal 100, the artificial intelligence part 130 may determine a speaker of the first chat as the first user and may determine a speaker of the second chat as the second user.

Upon determining the speaker of the chat, the artificial intelligence part 130 may acquire a speaker of at least one chat 1240 among one or more chats 1210, 1220, 1230, 1240, and 1250 as one or more keywords. For example, the artificial intelligence part 130 may acquire, as a keyword, a son that is a speaker of the at least one chat 1240 among a motor, a grandmother, and a son.

The artificial intelligence part 130 may acquire some words 1211, 1212, 1221, and 1241 included in the one or more chats 1210, 1220, 1230, 1240, and 1250 as one or more keywords.

In this case, the artificial intelligence part 130 may generate summary information 1310 including one or more keywords 1311, 1312, 1313, 1314, and 1315. The controller 180 may display the summary information 1310 including the one or more keywords 1311, 1312, 1313, 1314, and 1315.

As such, according to the present disclosure, summary information of numerous chats may be generated and displayed, thereby providing an environment for easily searching for required information, to a user. In particular, a speaker of a chat may be generated as a keyword, and thus personalized information may be advantageously provided.

Figure 14:
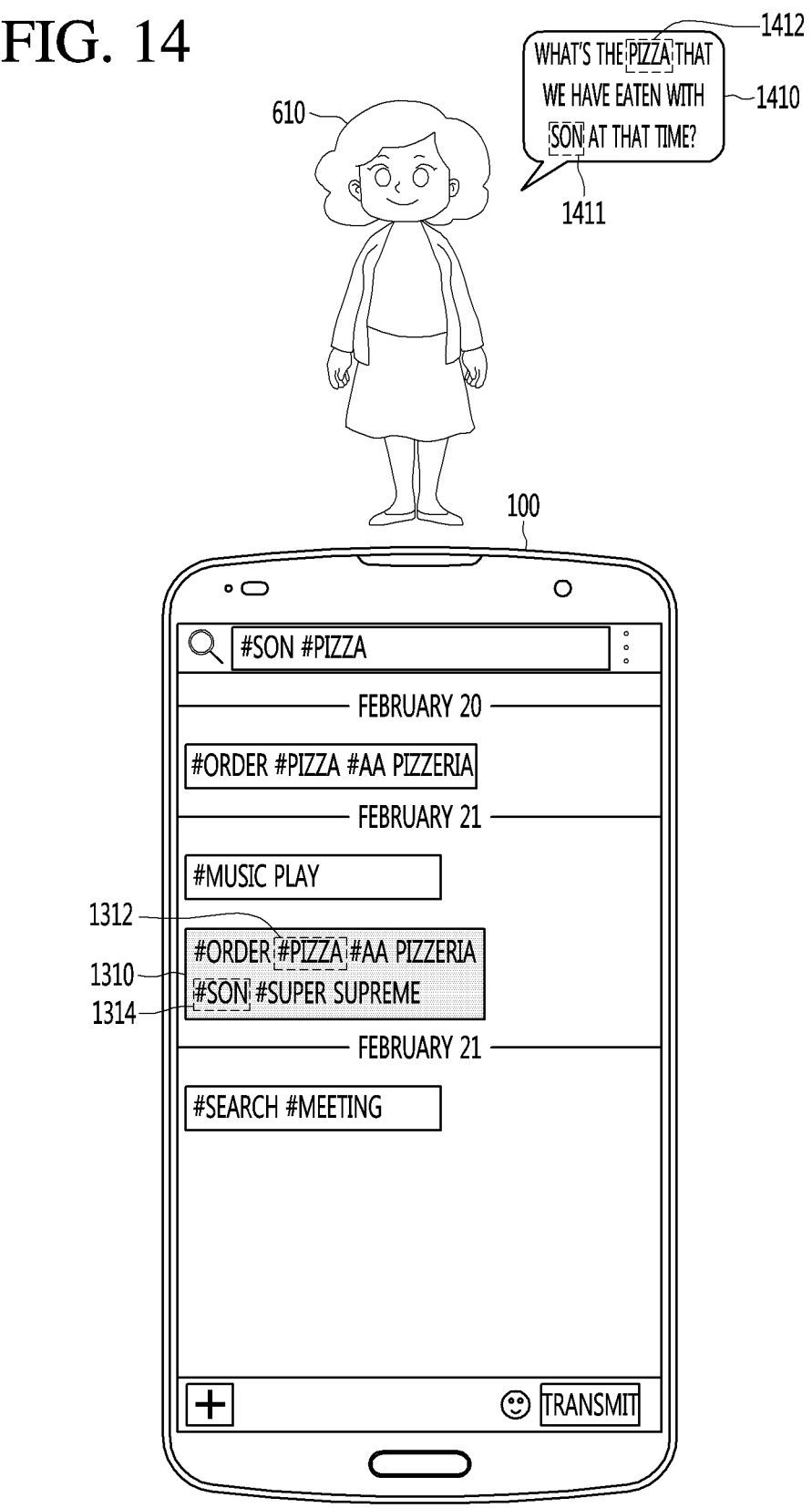
FIG. 14 is a diagram for explaining an operation method when there is an information search request according to an embodiment of the present disclosure.

FIG. 14 is a diagram for explaining an operation method when there is an information search request according to an embodiment of the present disclosure.

The mobile terminal 100 may receive an information search request 1410 from a user.

In this case, the artificial intelligence part 130 may acquire one or more pieces of summary information 1310 including a keyword corresponding to a search request among a plurality of pieces of summary information.

In detail, the search request 1410 may include a plurality of words. For example, the search request 1410 may include a first word 1411 and a second word 1412.

In this case, the artificial intelligence part 130 may select the first word 1411 and the second word 1412 that are used to search for information among a plurality of words included in the search request 1410, based on information learned using a machine learning function. In another example, the artificial intelligence part 130 may select the first word 1411 and the second word 1412 that are a noun among a plurality of words included in the search request 1410.

In this case, the artificial intelligence part 130 may search for a plurality of pieces of summary information and may acquire the summary information 1310 including keywords 1312 and 1314 matched with the first word 1411 and the second word 1412. In this case, the controller 180 may control the display 151 to display the acquired summary information 1310.

A word included in the search request and a keyword do not necessarily matched with each other, and it is sufficient that the word and the keyword are associated with each other.

For example, when a son's name is Chulsu and a search request is "What's the pizza that we have eaten with Chulsu at that time?", the artificial intelligence part 130 may acquire summary information including the keyword "son" and "pizza" among the plurality of pieces of summary information.

In another example, when the search request is "What's the pizza that we have eaten with family?", the artificial intelligence part 130 may acquire and display summary information including the keyword "pizza" and including any one of keywords "father", "son", and "grandmother" among a plurality of pieces of summary information.

In this case, a relationship between words may be learned using a machine learning algorithm.

The controller 180 may display the one or more pieces of summary information 1310 including a keyword corresponding to a search request of a user to be identified, under control of the artificial intelligence part 130. For example, the controller 180 may display the one or more pieces of summary information 1310 including a keyword corresponding to the search request of the user, with different colors.

As such, according to the present disclosure, summary information of numerous chats may be generated and displayed, thereby providing an environment for easily searching for required information, to a user. In particular, words that are frequently used by the user may be generated as a keyword and a user makes a request for searching using the word that is frequently used by the user, and thus, the accuracy of searching may be advantageously improved.

The user may rapidly and easily recognize content of a chat using summary information, and when more detailed information is required, the summary information may be selected to check all detailed chats.

In addition, searching is performed based on the keyword extracted from the chat, and thus may be easily and rapidly performed.

Figure 15:
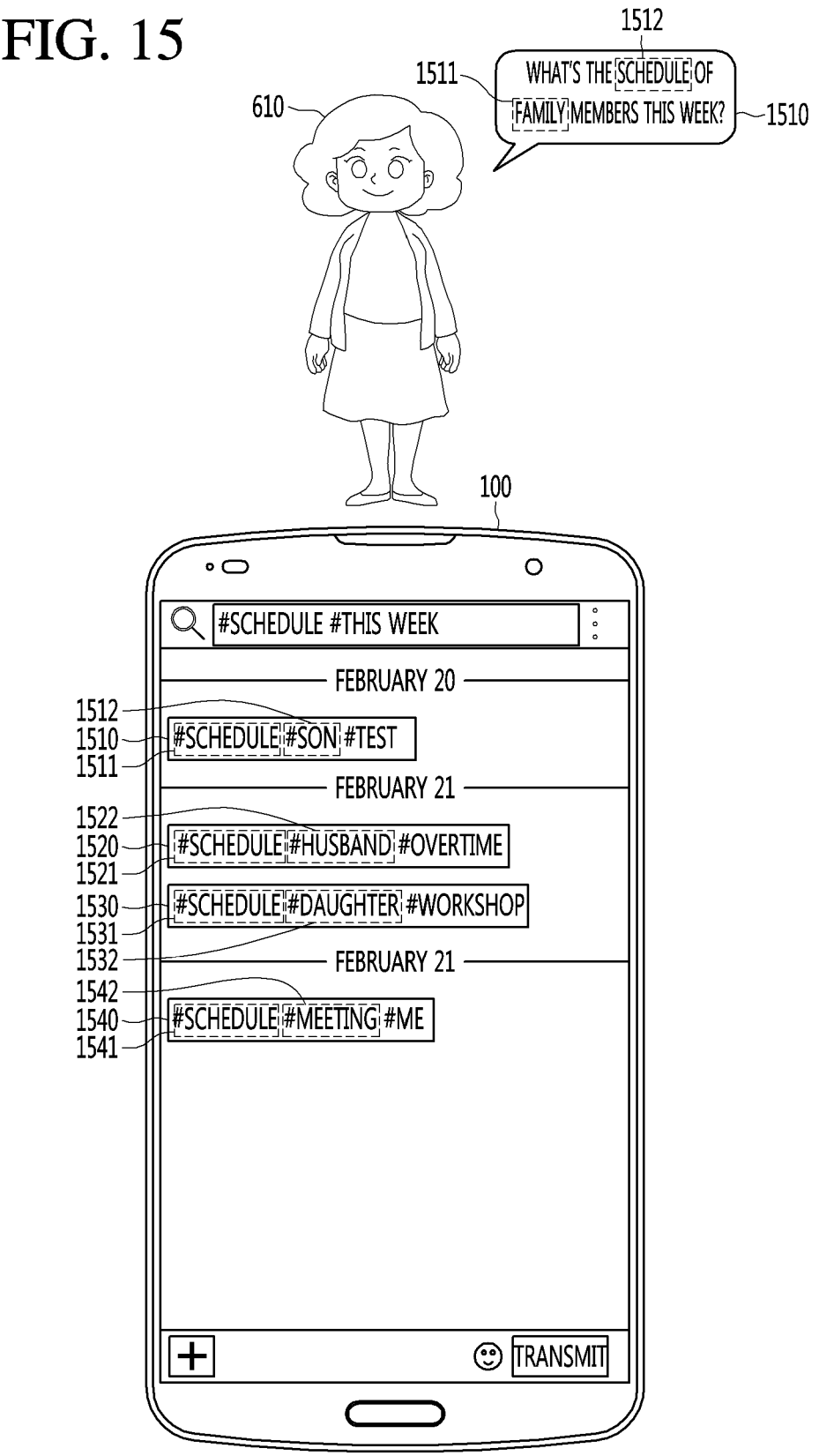
FIG. 15 is a diagram for explaining an operation method when there is information search request according to another embodiment of the present disclosure.

FIG. 15 is a diagram for explaining an operation method when there is information search request according to another embodiment of the present disclosure.

The mobile terminal 100 may receive an information search request 1510 from a user.

In this case, the artificial intelligence part 130 may display one or more pieces of summary information 1510, 1520, 1530, and 1540 including a keyword corresponding to the search request 1510 among a plurality of pieces of summary information.

In detail, the search request 1510 may include a plurality of words. For example, the search request 1510 may include a first word 1511 and a second word 1512.

In this case, the artificial intelligence part 130 may acquire the one or more pieces of summary information 1510, 1520, 1530, and 1540 including keywords 1511, 1512, 1521, 1522, 1531, 1532, 1541, and 1542 corresponding to the first word 1511 and the second word 1512.

In detail, a keyword corresponding to the second word 1512 may be first keywords 1511, 1521, 1531, and 1541.

The keyword corresponding to the first word 1511 may be the second keyword 1512, the third keyword 1522, the fourth keyword 1532, and the fifth keyword 1542.

In this case, the artificial intelligence part 130 may acquire the one or more pieces of summary information 1510, 1520, 1530, and 1540 including a keyword corresponding to the first word 1511 and a keyword corresponding to the second word 1512.

In this case, the controller 180 may control the display 151 to display the acquired one or more pieces of summary information 1510, 1520, 1530, and 1540.

Upon receiving input for selecting any one of the one or more pieces of summary information 1510, 1520, 1530, and 1540, the artificial intelligence part 130 may acquire one or more chats corresponding to the selected summary information. In this case, the controller 180 may control the display 151 to display the one or more chats.

Referring to FIG. 15, chats of a plurality of users may be shared with each other. For example, when a first user of family members chats to the artificial intelligence agent and there is an information search request of a second user, the artificial intelligence part 130 may provide a chat made to the artificial intelligence agent by the first user, to the second user.

The artificial intelligence agent may frequently provide a service to a plurality of users. In this case, according to the present disclosure, a plurality of users may a chat, thereby enhancing user convenience.

However, the present disclosure is not limited thereto and chat sharing may be limited by user setting, which will be described in detail with reference to FIGS. 16 and 17.

Figure 16:
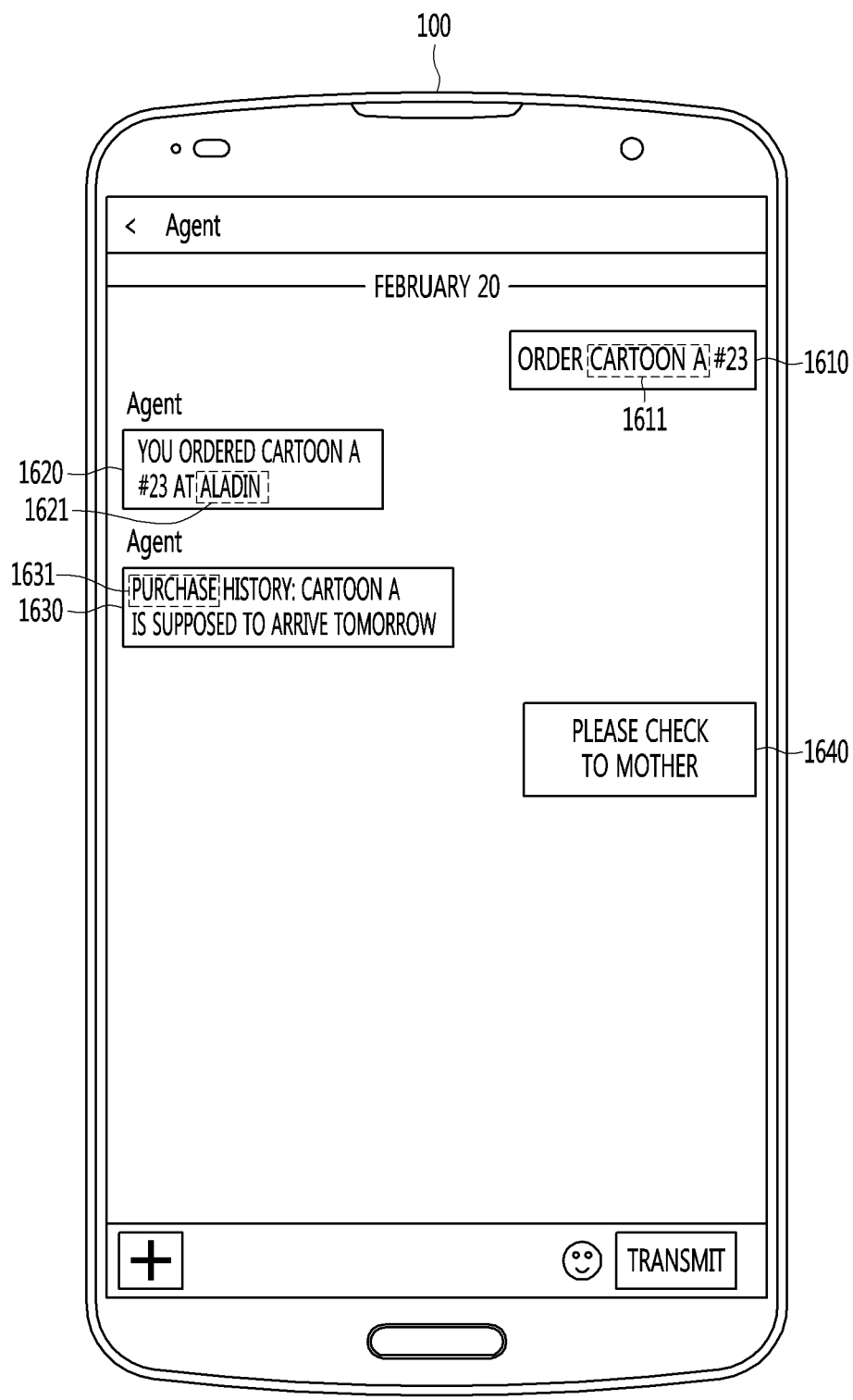
FIGS. 16 and 17 are diagrams for explaining a method of setting access prevention to a chat according to an embodiment of the present disclosure.
Figure 17:
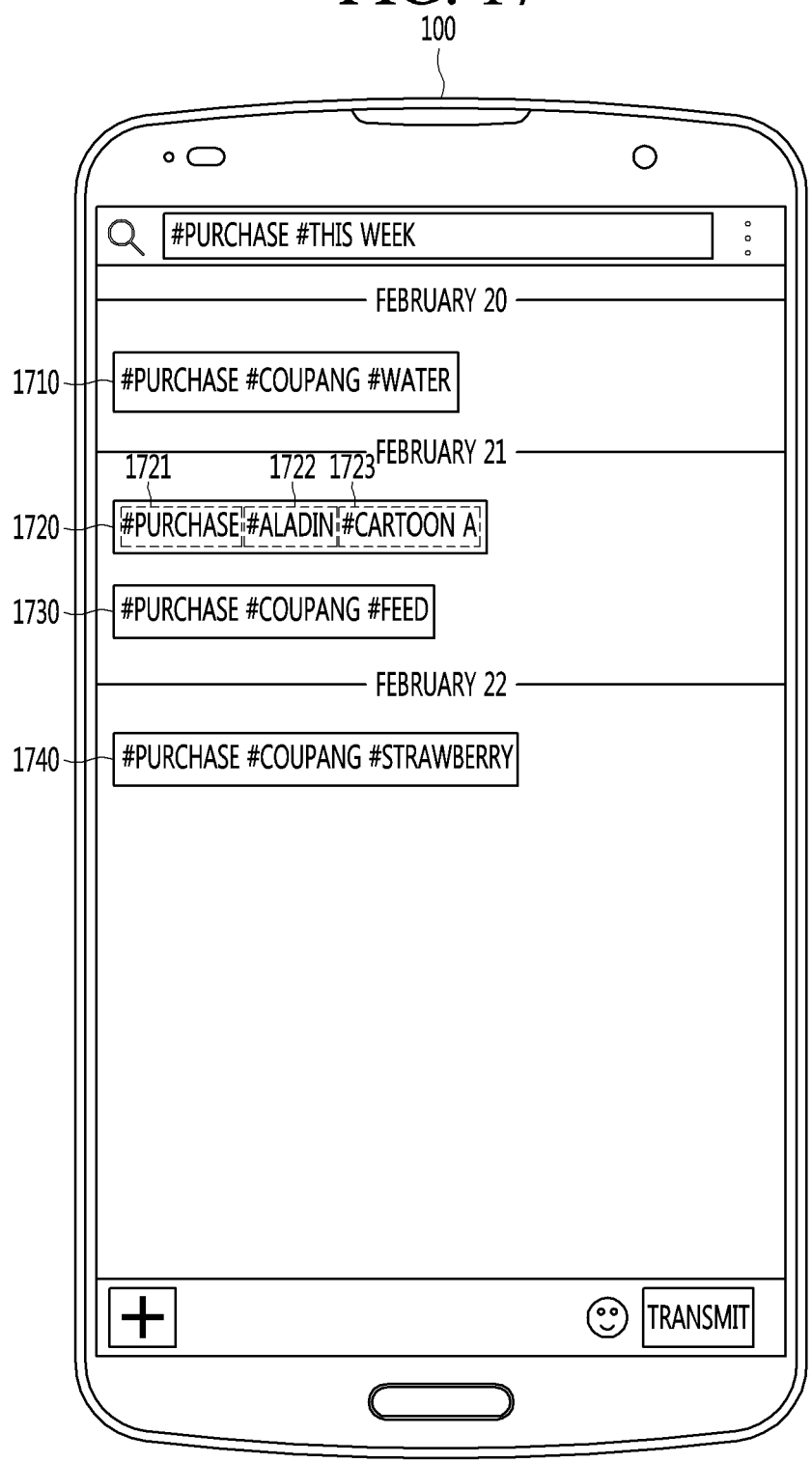

FIGS. 16 and 17 are diagrams for explaining a method of setting access prevention to a chat according to an embodiment of the present disclosure.

The artificial intelligence part 130 may acquire one or more chats 1610, 1620, 1630, and 1640, may one or more keywords 1611, 1621, and 1631 corresponding to the one or more chats 1610, 1620, 1630, and 1640, and may acquire summary information including the one or more keywords 1611, 1621, and 1631.

A speaker of at least one chat among the one or more chats 1610, 1620, 1630, and 1640 may be a first speaker. For example, the first speaker may be a son among a plurality of family members.

The artificial intelligence part 130 may receive input 1640 for designating the specific keyword 1611 from the first speaker.

For example, as shown in FIG. 16, the artificial intelligence part 130 may receive input for designating a cartoon A.

The artificial intelligence part 130 may receive the information search request. The artificial intelligence part 130 may identify a speaker that makes the information search request.

First, the case in which information search request is received from a first speaker that designates the specific keyword 1611 will be described.

When information search request is received from the first speaker and a specific keyword 1723 is included in summary information 1720 including a keyword corresponding to the information search request, the artificial intelligence part 130 may display the summary information 1720 including a specific keyword.

In detail, when a keyword corresponding to the information search request is a first keyword 1721, the artificial intelligence part 130 may acquire the summary information 1720 including the first keyword 1721. The summary information 1720 including the first keyword 1721 may also include a second keyword 1722 and the specific keyword 1723.

In this case, the artificial intelligence part 130 may also acquire the summary information 1720 including the specific keyword 1611, and the controller 180 may display the acquired summary information.

Hereinafter, the case in which an information search request is received from the second speaker from the first speaker will be described.

When the information search request is received from the second speaker and the specific keyword 1723 is included in the summary information including a keyword corresponding to the information search request, the artificial intelligence part 130 may not display the summary information 1720 including a specific keyword.

In detail, when a keyword corresponding to the information search request is the first keyword 1721, the artificial intelligence part 130 may acquire the summary information 1720 including the first keyword 1721. The summary information 1720 including the first keyword 1721 may also include the second keyword 1722 and the specific keyword 1723.

In this case, the artificial intelligence part 130 may not display the summary information 1720 including the specific keyword 1723.

For example, when an information search request for "purchase" is received from a mother, a plurality of pieces of summary information 1710, 1720, 1730, and 1740 including a keyword "purchase" may be displayed.

However, when input for designating "cartoon A" is received from a son and an information search request for "purchase" is received from a mother, the remaining summary information 1710, 1730, and 1740 except for the summary information 1720 including the "cartoon A" among the plurality of pieces of summary information 1710, 1720, 1730, and 1740 including keyword "purchase" may be displayed.

In addition, when an input for designating "cartoon A" is received from a son and an information search request for "purchase" is received from the son, the plurality of pieces of summary information 1710, 1720, 1730, and 1740 including a keyword "purchase" may be displayed.

Although the case in which only a specific keyword is designated has been described according to the present embodiment, the present disclosure is not limited thereto.

In detail, the artificial intelligence part 130 may receive an input for designating a specific speaker and a specific keyword from the first speaker.

In this case, when an information search request is received from the specific speaker and the specific keyword is included in summary information including a keyword corresponding to the information search request, the artificial intelligence part 130 may not display summary information including the specific keyword.

For example, the artificial intelligence part 130 may receive an input for designating a motor and cartoon A from a son. In this case, when the information search request is received from "mother" and "cartoon A" is included in the summary information including the keyword corresponding to the information search request, the artificial intelligence part 130 may not display summary information including "cartoon A".

In contrast, when an information search request is received from a "father" or a "son" and "cartoon A" is included in summary information including a keyword corresponding to the information search request, the artificial intelligence part 130 may display the summary information including the "cartoon A".

The artificial intelligence agent frequently provides a service to a plurality of users. In this case, the present disclosure may provide an environment for protecting privacy by a plurality of users.

Figure 18:
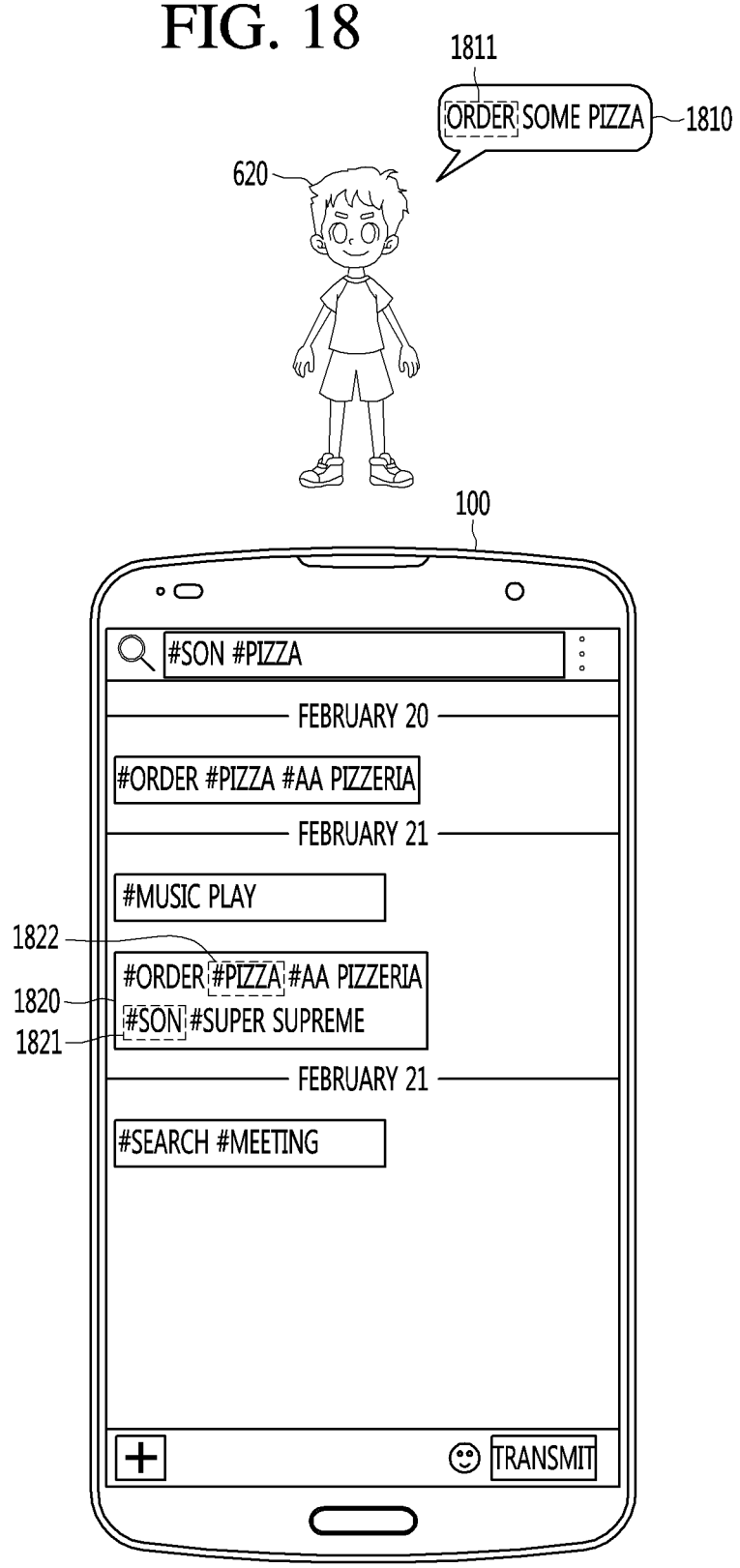
FIGS. 18 and 19 are diagrams for explaining a method of providing a service to which user preference is applied according to an embodiment of the present disclosure.
Figure 19:
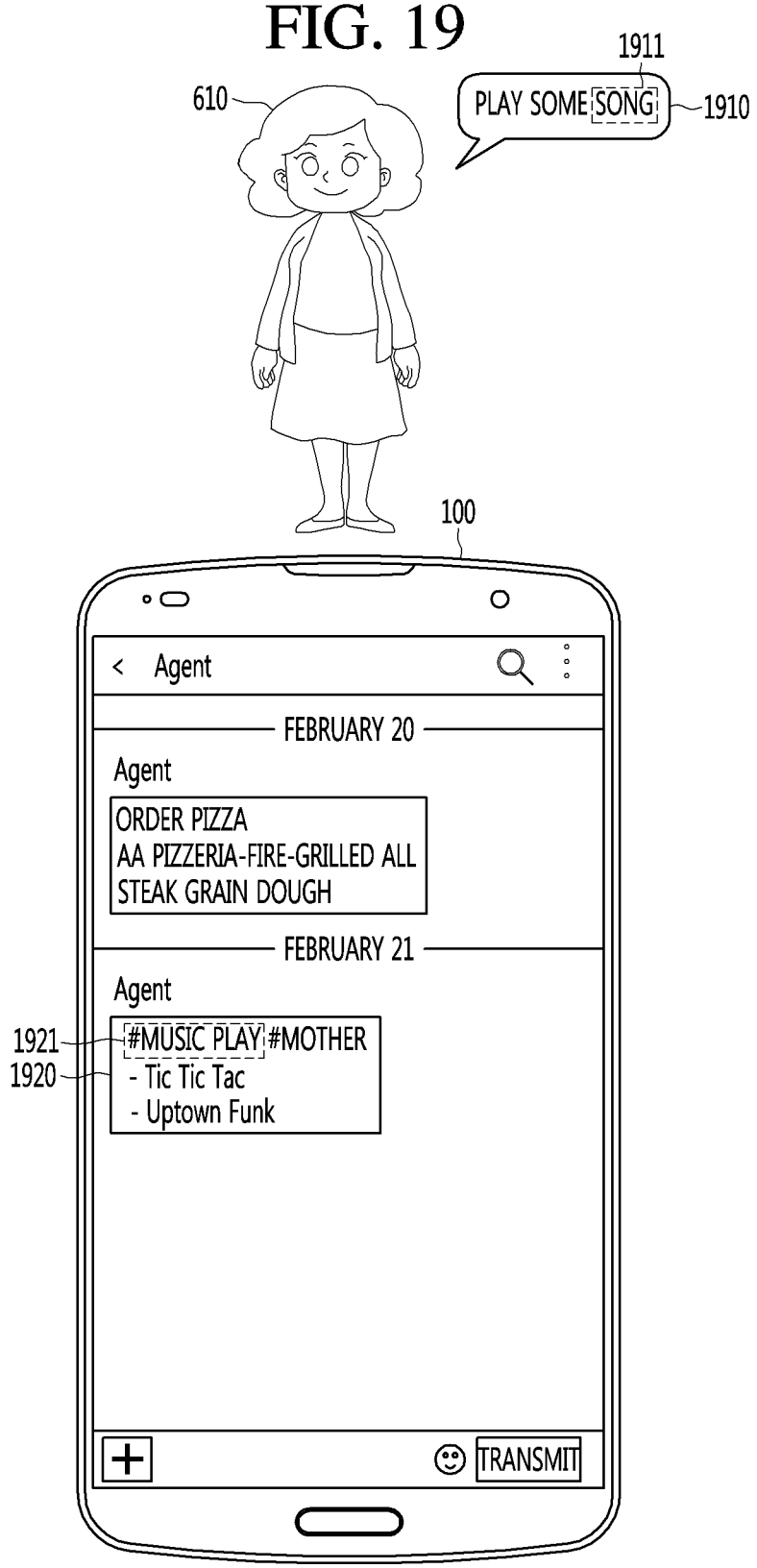

FIGS. 18 and 19 are diagrams for explaining a method of providing a service to which user preference is applied according to an embodiment of the present disclosure.

Referring to FIG. 18, the artificial intelligence part 130 may receive a service providing request 1810 from a user 620.

Upon receiving the service providing request 1810 from the user, the artificial intelligence part 130 may acquire information on a speaker 620 that makes a service providing request. For example, the artificial intelligence part 130 may determine the speaker 620 that makes the service providing request, as a son.

The artificial intelligence part 130 may provide a service corresponding to the service providing request. In detail, the artificial intelligence part 130 may perform a function or operation corresponding to the service providing request to provide a service corresponding to the service providing request.

For example, upon receiving a service providing request "Order some pizza", the artificial intelligence part 130 may provide a service for ordering pizza to the user.

The artificial intelligence part 130 may provide a service to which speaker preference is applied based on a chat of the speaker.

In detail, the artificial intelligence part 130 may search for summary information 1820 including a keyword corresponding to the service providing request 1810 and a keyword corresponding to the speaker 620 that makes a service providing request among a plurality of pieces of summary information.

For example, the artificial intelligence part 130 may search for the summary information 1820 including a keyword 1822 corresponding to pizza 1811 and a keyword 1821 corresponding to the speaker 620 that makes the service providing request.

In this case, the artificial intelligence part 130 may acquire speaker preference based on at least one of one or more chats corresponding to the summary information or summary information.

According to an embodiment, the artificial intelligence part 130 may acquire user preference based on a keyword included in summary information. For example, when a keyword "AA pizzeria" and "super supreme pizza" is included in the summary information, the artificial intelligence part 130 may determine preference of a son as a speaker with respect to pizza, as "super supreme pizza" of "AA pizzeria".

According to another embodiment, the artificial intelligence part 130 may acquire user preference based on one or more chats corresponding to the summary information. For example, when the first chat and the second chat are classified as one theme to generate, and a word "AA pizzeria" is included in the first chat and a keyword "super supreme pizza" is included in the second chat, the artificial intelligence part 130 may determine preference of a son as a speaker with respect to pizza, as "super supreme pizza" of "AA pizzeria".

In this case, the artificial intelligence part 130 may provide a service to which user preference is applied. For example, the artificial intelligence part 130 may order super supreme pizza at the AA pizzeria.

As such, according to the present disclosure, a speaker may be included in a keyword, and thus it may be advantageously that individual preference is easily recognized and a personalized service is advantageously provided.

Although the case in which a speaker is included in summary information has been described with reference to FIG. 18, the present disclosure is not limited thereto.

This will be described with reference to FIG. 19.

Upon receiving a service providing request 1910 from the user 620, the artificial intelligence part 130 may determine a speaker that makes the service providing request, as a mother 610.

The artificial intelligence part 130 may store summary information 1920 and may also store a speaker corresponding to the summary information 1920. For example, when the summary information 1920 is generated based on one or more chats between an artificial intelligence agent and a mother, the artificial intelligence part 130 may store the summary information 1920 and may also store a mother as a speaker corresponding to the summary information 1920.

The artificial intelligence part 130 may provide a service to which speaker preference is applied, based on a chat of the speaker.

In detail, the artificial intelligence part 130 may search for the summary information 1920 that includes a keyword corresponding to the service providing request 1910 and corresponds to a speaker that makes the service providing request 1910 among a plurality of pieces of summary information.

For example, the artificial intelligence part 130 may search for the summary information 1920 that includes a keyword 1921 corresponding to a song 1911 and is matched with a mother and is stored.

In this case, the artificial intelligence part 130 may acquire speaker preference based on at least one of one or more chats corresponding to summary information or summary information, and may provide a service to which speaker preference is applied.

For example, the artificial intelligence part 130 may provide a service for playing a son to which a mother frequently listens.

Figure 20:
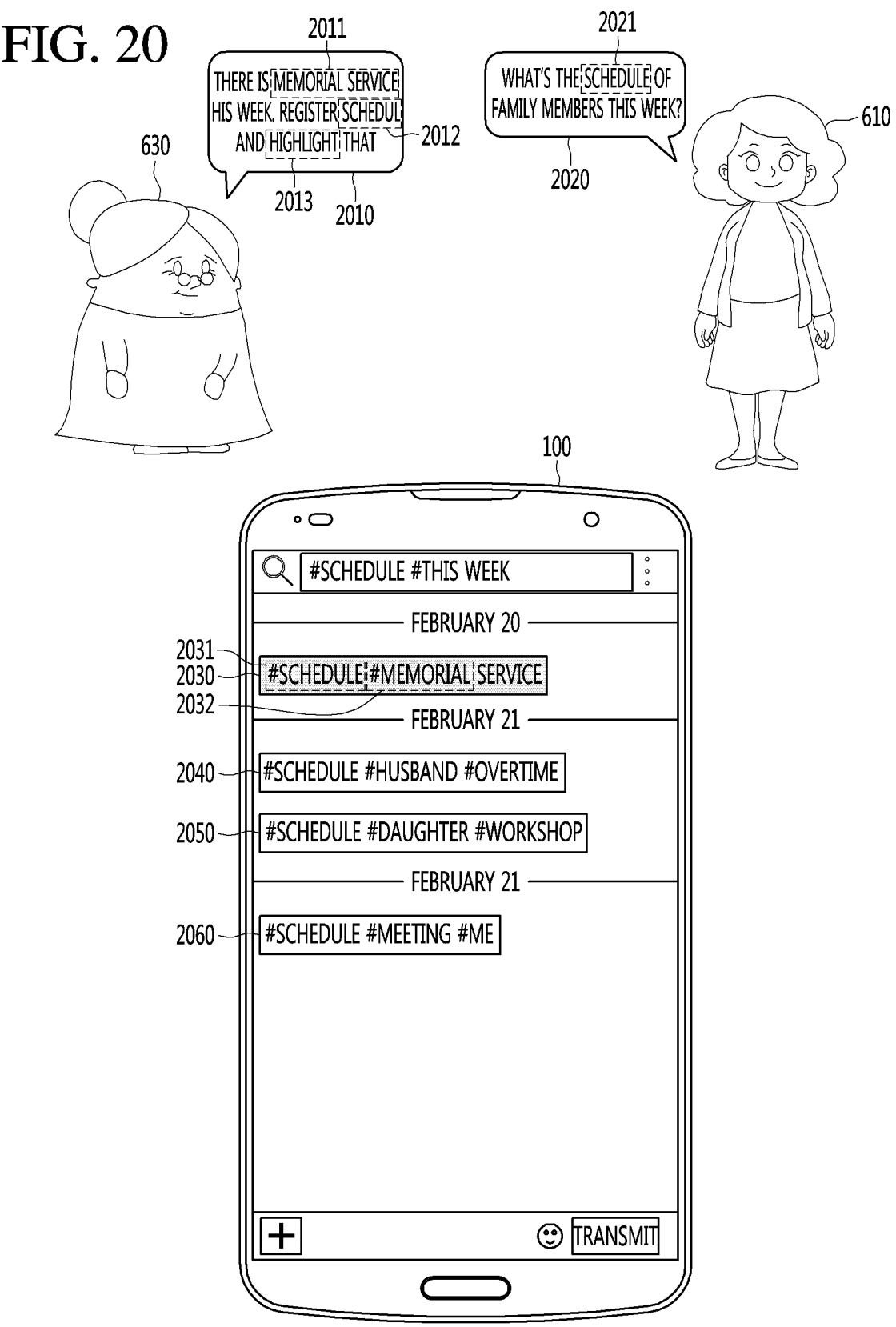
FIG. 20 is a diagram for explaining a method of setting a searching priority according to an embodiment of the present disclosure.

FIG. 20 is a diagram for explaining a method of setting a searching priority according to an embodiment of the present disclosure.

The mobile terminal 100 may acquire one or more chats 2010. In this case, the artificial intelligence part 130 may generate summary information 2030 that includes words 2011 and 2012 included in one or more chats, as keywords 2031 and 2032.

The mobile terminal 100 may receive an input 2013 for setting priority for the summary information 2030, from a user 630. In this case, the artificial intelligence part 130 may assign a high priority to the generated summary information 2030.

The mobile terminal 100 may receive an information search request 2020 from a user 610.

In this case, the artificial intelligence part 130 may display one or more pieces of summary information 2030, 2040, 2050, and 2060 including a keyword corresponding to a search request 2020 among a plurality of pieces of summary information.

For example, upon receiving a search request for a schedule, the artificial intelligence part 130 may display the one or more pieces of summary information 2030, 2040, 2050, and 2060 including a keyword of the schedule.

In this case, the artificial intelligence part 130 may display the summary information 2030 to which a priority is assigned, to be identified.

For example, the artificial intelligence part 130 may most preferentially display the summary information 2030 to which a priority is assigned, may display the summary information 2030 at the uppermost level, or may display the summary information 2030 with different color.

Figure 21:
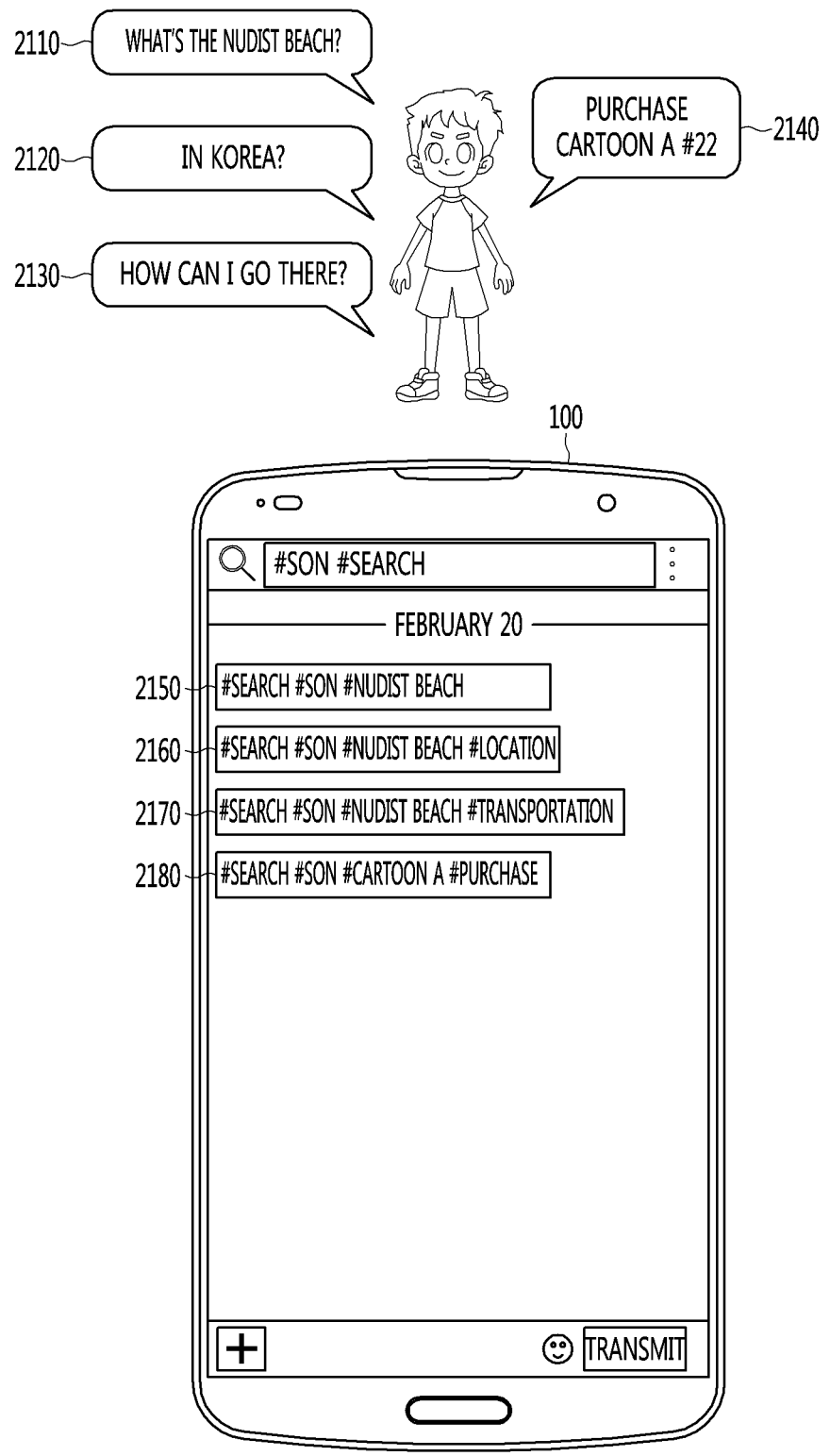
FIG. 21 is a diagram for explaining a method of blocking provision of a service related to a specific keyword to a specific speaker according to an embodiment of the present disclosure.

FIG. 21 is a diagram for explaining a method of blocking provision of a service related to a specific keyword to a specific speaker according to an embodiment of the present disclosure.

The artificial intelligence part 130 may generate one or more pieces of summary information 2150, 2160, 2170, and 2180 each including one or more keywords using one or more chats 2110, 2120, 2130, and 2140 of the first user 620.

When there is a request of the second user, the artificial intelligence part 130 may display the one or more pieces of summary information 2150, 2160, 2170, and 2180 generated using the chat of the first user.

For example, when the one or more pieces of summary information 2150, 2160, 2170, and 2180 is generated by a chat of a son, and there is a request of a mother, the artificial intelligence part 130 may display the one or more pieces of summary information 2150, 2160, 2170, and 2180.

The mobile terminal 100 may receive an input for designating a specific speaker and a specific keyword.

Upon receiving a service providing request related to a specific keyword from a specific speaker, the artificial intelligence part 130 may block provision of a service corresponding to the service providing request.

For example, the mobile terminal 100 may receive an input for designating "son" and "nudist beach" from a mother. Upon receiving a service providing request for information on "nudist beach" from "son", the artificial intelligence part 130 may not provide information on the nudist beach to the son.

In another example, the mobile terminal 100 may receive an input for designating "son" and "purchase" from a mother. Upon receiving a service providing request for "purchase" from "son", the artificial intelligence part 130 may not provide a purchase service to the user.

As such, according to the present disclosure, a service provided to another person may be easily limited based on an extracted keyword.

Although a chat is mainly made between an artificial intelligence agent and a user has been described according to the aforementioned embodiment, the present disclosure is not limited thereto.

In detail, the artificial intelligence part 130 may acquire one or more chats in which one or more users participates as a speaker. For example, when a son and a mother chat to each other in a living room at home, the artificial intelligence part 130 may store one or more chats between the son and the mother, may acquire one or more keywords corresponding to one or more chats between the son and the mother, and may generate summary information including the one or more keywords.

The one or more chats may be a chat in which one or more users participate as a speaker in a chat window on a messenger.

This will be described in detail with reference to FIG. 22.

Figure 22:
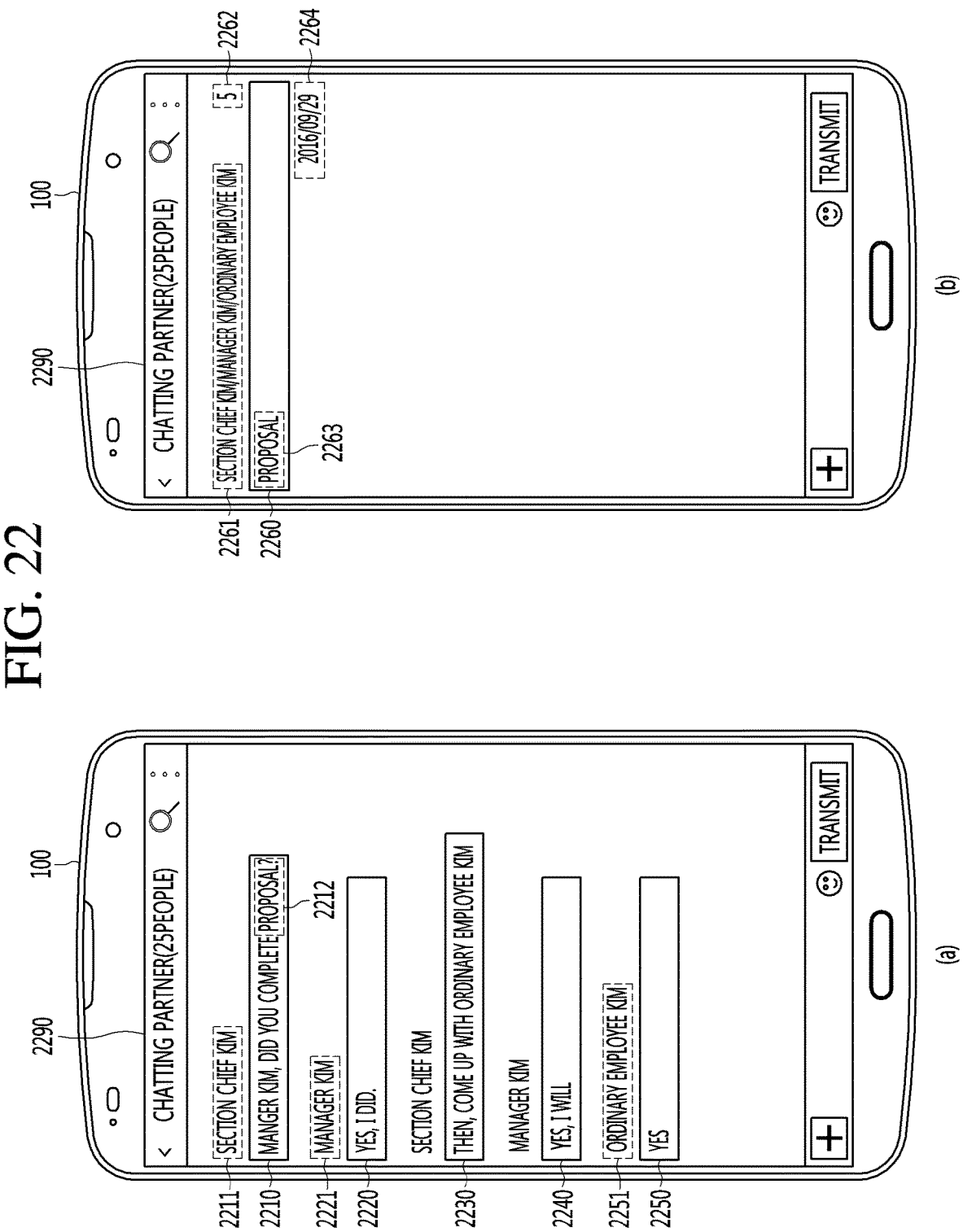
FIG. 22 is a diagram for explaining a method of generating summary information on chats in a chat window of a messenger according to an embodiment of the present disclosure.

FIG. 22 is a diagram for explaining a method of generating summary information on chats in a chat window of a messenger according to an embodiment of the present disclosure.

The artificial intelligence part 130 may acquire and display one or more chats 2010, 2020, 2030, 2040, and 2050.

In detail, the artificial intelligence part 130 may receive a text input of the user through the input interface 120 and may display a text corresponding to the text input. In addition, a terminal of another user may receive a text input of the other user and may transmit a text corresponding to the text input to the mobile terminal 100. In this case, the artificial intelligence part 130 may receive the text from the terminal of the other user and may display the received text.

The artificial intelligence part 130 may display the one or more chats 2010, 2020, 2030, 2040, and 2050 on a chat window 2290 of a messenger.

The artificial intelligence part 130 may acquire one or more keywords corresponding to the one or more chats 2010, 2020, 2030, 2040, and 2050 and may display summary information 2260 including the one or more keywords 2261 and 2263 on the chat window 2290 of the messenger.

Here, the one or more keywords 2261 and 2263 may be at least one of a word 2212 included in one or more chats 2210, 2220, 2230, 2240, and 2250 or speakers 2211, 2221, and 2251 of the one or more chats 2210, 2220, 2230, 2240, and 2250.

The summary information 2260 may include at least one of the one or more keywords 2261 and 2263, the number 2262 of the one or more chats 2210, 2220, 2230, 2240, and 2250, or a chatting time 2264 of one or more chats.

Here, the chatting time 2264 of the one or more chats may refer to a time at which one or more chats are finished.

The summary information 2260 may be displayed using various methods.

According to an embodiment, the artificial intelligence part 130 may display the one or more chats 2210, 2220, 2230, 2240, and 2250 on the chat window 2290 and may also display the summary information 2260 of the one or more chats 2210, 2220, 2230, 2240, and 2250 on the chat window 2290.

According to another embodiment, the artificial intelligence part 130 may display the one or more chats 2210, 2220, 2230, 2240, and 2250 on the chat window 2290, and when a preset time elapses after the one or more chats 2210, 2220, 2230, 2240, and 2250 are finished, the artificial intelligence part 130 may display the summary information 2260 instead of the one or more chats 2210, 2220, 2230, 2240, and 2250 on the chat window 2290.

The artificial intelligence part 130 may store the one or more chats 2210, 2220, 2230, 2240, and 2250 in the memory 170.

Upon receiving an input for selecting the summary information 2260, the artificial intelligence part 130 may display the one or more chats 2210, 2220, 2230, 2240, and 2250.

A speaker of the one or more chats 2210, 2220, 2230, 2240, and 2250 may be some of all participants of the chat window 2290.

In detail, the chat window 2290 may be in the state in which a plurality of users participates and a plurality of chats may be present. The one or more chats 2210, 2220, 2230, 2240, and 2250 may be classified as the same theme among a plurality of chats and may be a chat in which some of a plurality of users participate as a speaker. Thus, a speaker of the one or more chats 2210, 2220, 2230, 2240, and 2250 may be some of all participants of the chat window 2290.

A plurality of chats may be classified as the same theme using various methods. In detail, as described above, some of a plurality of chats may be classified as the same theme based on at least one of a time interval between chats or content of a chat.

When a chat is maintained for a predetermined time or more in the state in which a user of the mobile terminal 100 does not participate, chats made for the predetermined time may be classified as one theme. Thus, the artificial intelligence part 130 may generate summary information of chats that are made for a predetermined time in the state in which a user does not participate.

The artificial intelligence part 130 may receive an input for designating a specific time range. In this case, the artificial intelligence part 130 may classify chats made in a specific time range as one theme and may generate summary information corresponding to chats made in the specific time range.

The artificial intelligence part 130 may receive an input for designating one or more chats. In this case, the artificial intelligence part 130 may generate summary information corresponding to chats designated as the same theme.

As such, according to the present disclosure, summary information of numerous chats may be generated and displayed, thereby providing an environment for easily searching for required information by a user.

Although the case in which summary information is displayed in the chat window 2290 has been described according to the aforementioned embodiment, the present disclosure is not limited thereto.

This will be described in detail with reference to FIG. 23.

Figure 23:
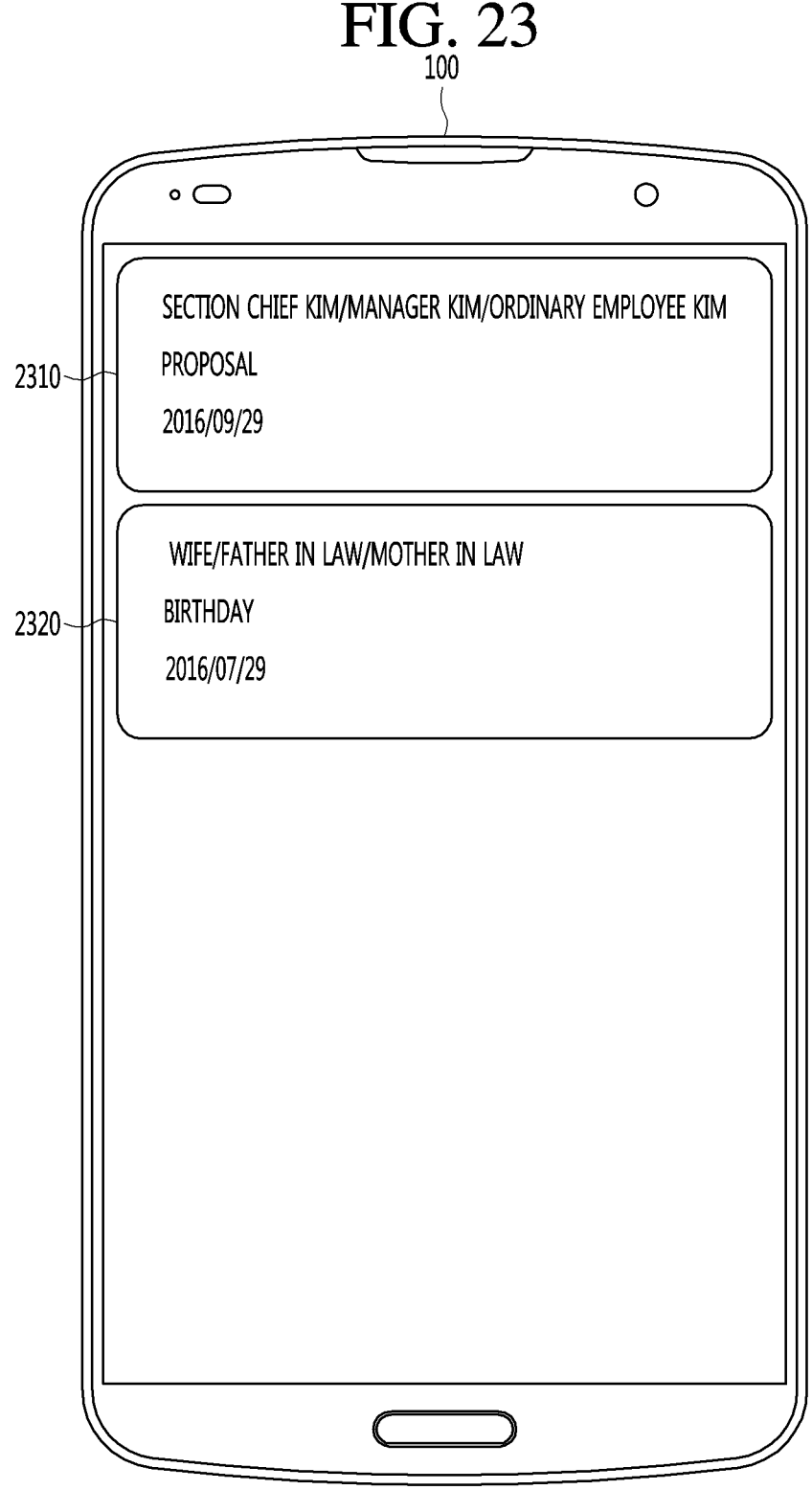
FIG. 23 is a diagram for explaining a method of displaying summary information according to an embodiment of the present disclosure.

FIG. 23 is a diagram for explaining a method of displaying summary information according to an embodiment of the present disclosure.

The artificial intelligence part 130 may receive an input for storing summary information. In this case, summary information and one or more chats corresponding to the summary information may be stored.

Upon receiving an input for displaying summary information, the artificial intelligence part 130 may display the stored one or more pieces of summary information 2310 and 2320.

In this case, the one or more pieces of summary information 2310 and 2320 may be generated based on one or more chats included in different chat windows.

In detail, first summary information 2310 may be summary information corresponding to one or more chats performed in a first chat window. In addition, second summary information 2320 may be summary information corresponding to one or more chats performed in a second chat window.

In this case, the artificial intelligence part 130 may display together the first summary information 2310 corresponding to one or more chats performed in the first chat window and the second summary information 2320 corresponding to one or more chats performed in the second chat window.

Upon receiving an input for selecting the first summary information 2310 corresponding to one or more chats performed in the first chat window, the artificial intelligence part 130 may display the second chat window in which a speaker of one or more chats performed in the first chat window participates and may display one or more chats performed in the first chat window, on the second chat window.

For example, when a participant of the first chat window is department chief KIM, section chief KIM, manager KIM, and ordinary employee KIM, and first summary information corresponding to a chat of the section chief KIM, a chat of the manager KIM, and a chat of the ordinary employee KIM is generated, the artificial intelligence part 130 may display the second chat window in which the section chief KIM, the manager KIM, and the ordinary employee KIM participate, and may display the chat of the section chief KIM, the chat of the manager KIM, and the chat of the ordinary employee KIM on the second chat window.

When a new chat is performed in the second chat window, the artificial intelligence part 130 may update summary information.

In detail, when a new chat is performed in the second chat window and a new keyword corresponding to the new chat is acquired, the artificial intelligence part 130 may add the new keyword to the summary information and may change the summary information.

When the number of chats increases as a new chat is performed in the second chat window, the artificial intelligence part 130 may increase the number of chats included in summary information.

When a time of terminating a chat is changed as a new chat is performed in the second chat window, the artificial intelligence part 130 may change the time of terminating a chat included in the summary information.

As such, the present disclosure may provide an environment in which users interested in a specific theme continuously made a chat on a specific theme. Accordingly, summary information may be continuously updated, and thus summary information may accurately represent an actual chat.

Figure 24:
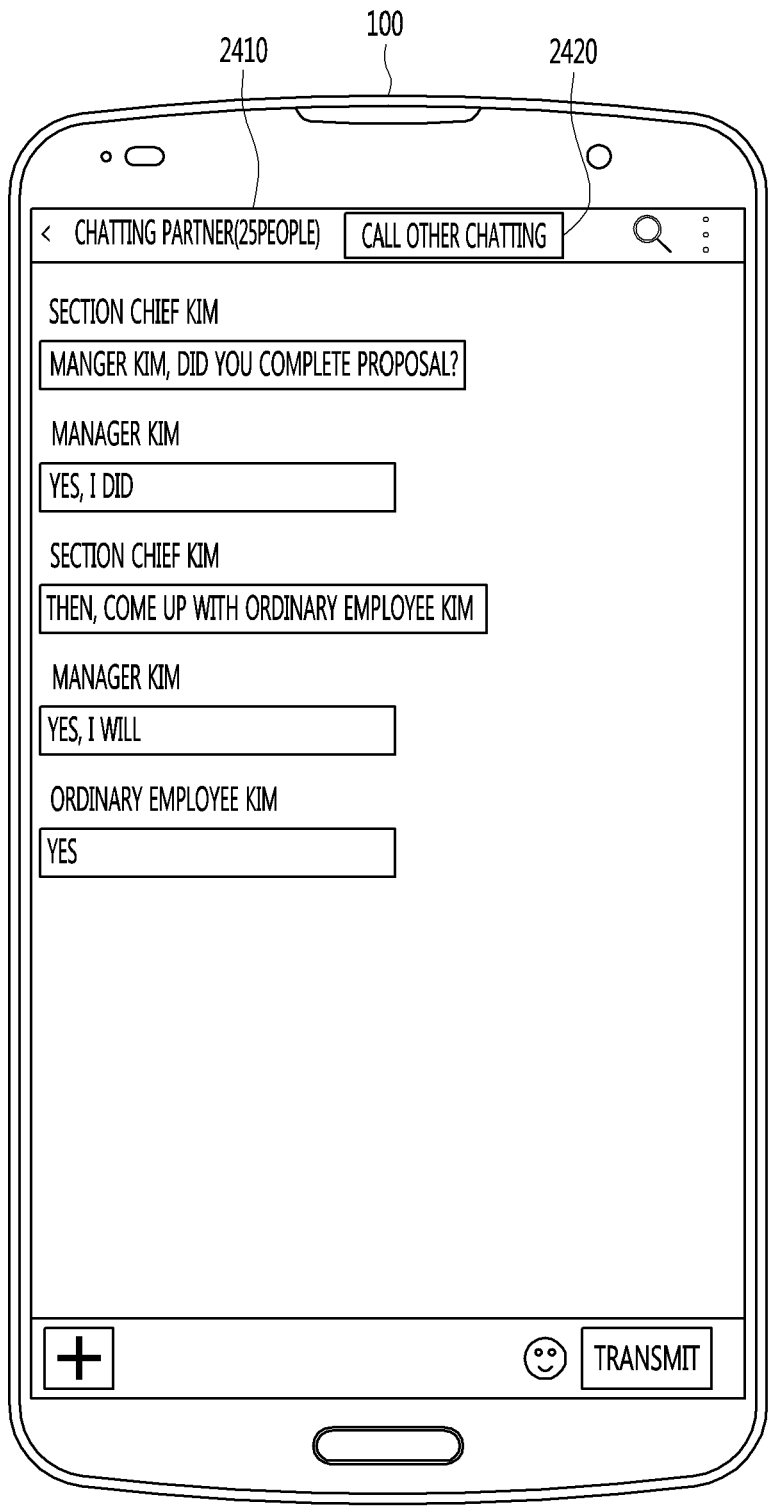
FIGS. 24 to 26 are diagrams for explaining a method of calling summary information from a chat window according to an embodiment of the present disclosure.
Figure 25:
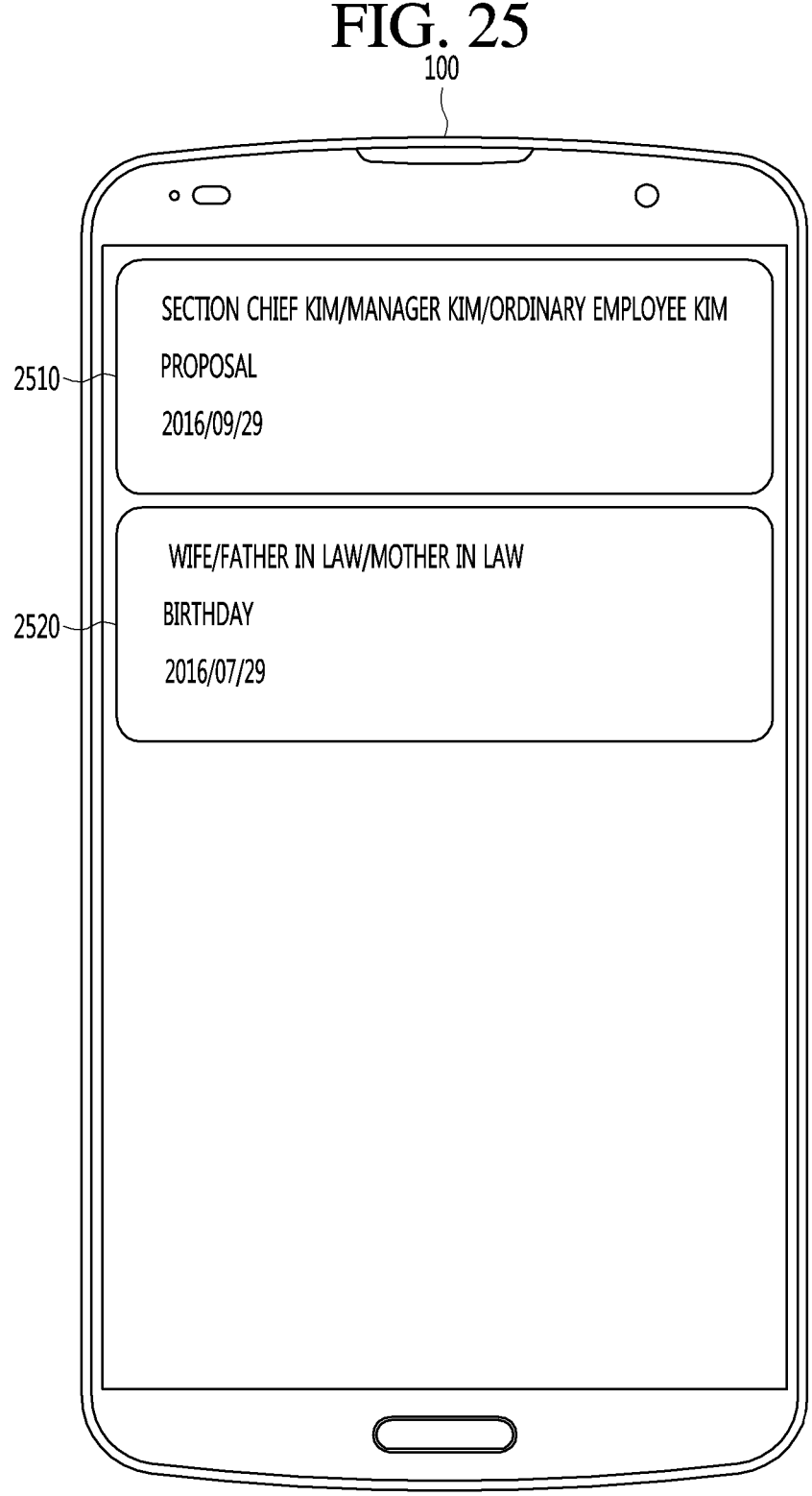
Figure 26:
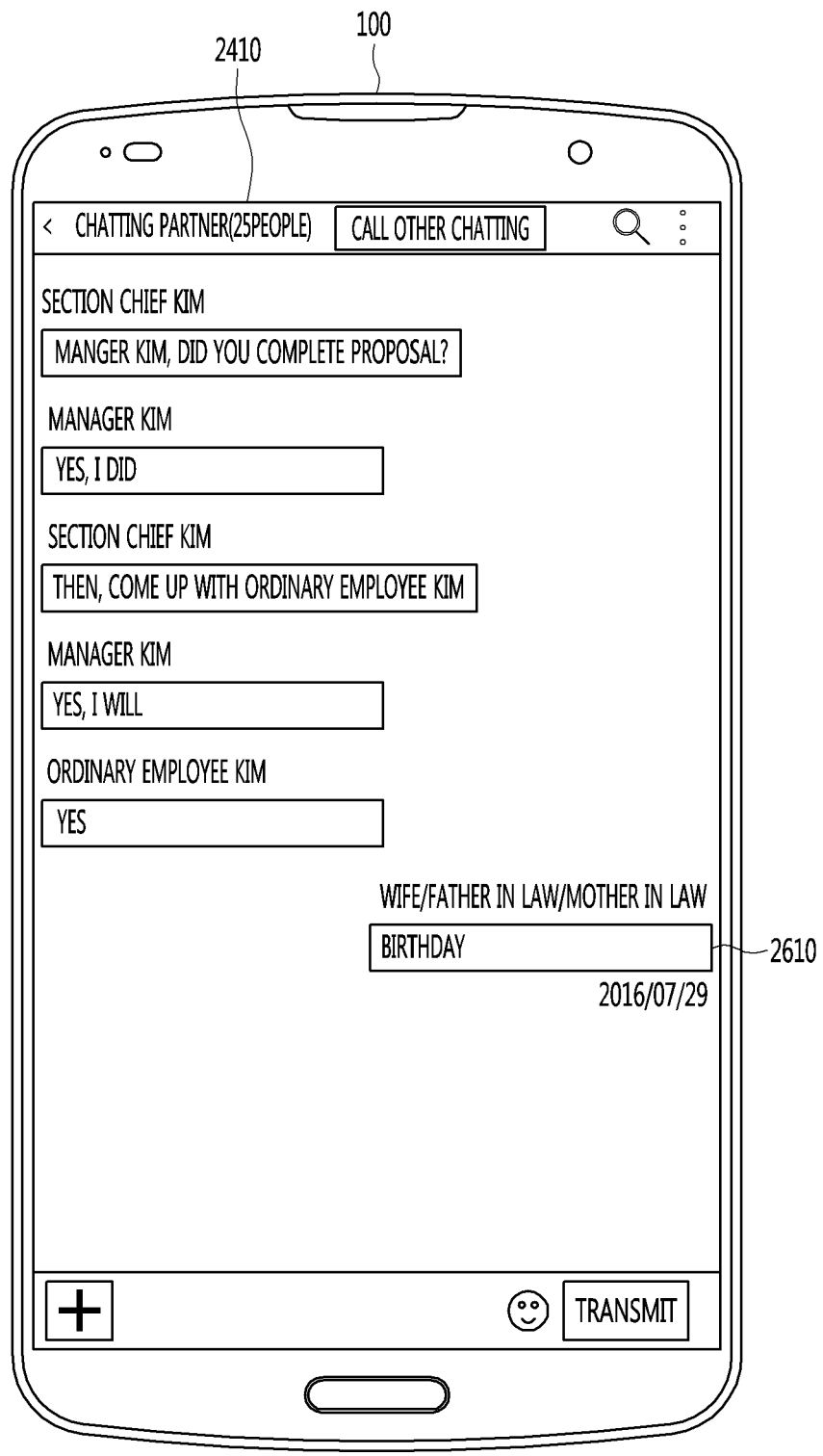

FIGS. 24 to 26 are diagrams for explaining a method of calling summary information from a chat window according to an embodiment of the present disclosure.

Referring to FIG. 24, a current state is a state in which a plurality of chats is displayed on a third chat window 2410.

The artificial intelligence part 130 may display an icon 2420 to be selected to display summary information.

Upon receiving an input for selecting the icon 2420, the artificial intelligence part 130 may display a plurality of pieces of summary information 2510 and 2520 as shown in FIG. 25.

The artificial intelligence part 130 may display a user interface (UI) for editing a plurality of pieces of summary information.

In detail, upon receiving an input for integrating the plurality of pieces of summary information 2510 and 2520, the artificial intelligence part 130 may combine one or more chats corresponding to first summary information 2510 and one or more chats corresponding to second summary information 2520 and may generate and display summary information corresponding to the plurality of combined chats.

Upon receiving an input for splitting the first summary information 2510, the artificial intelligence part 130 may generate and display summary information corresponding to some of a plurality of chats corresponding to the first summary information 2510, and may generate and display summary information corresponding to other some of the plurality of chats corresponding to the first summary information 2510.

The plurality of pieces of summary information 2510 and 2520 may be displayed with different colors based on a keyword, a speaker, or the like.

Upon receiving an input for selecting the first summary information 2510, the artificial intelligence part 130 may upload first summary information 2610 and one or more chats corresponding thereto to the third chat window 2410, as shown in FIG. 26.

The artificial intelligence part 130 may display the first summary information 2610. The first summary information 2610 may also be displayed on the third chat window 2410 by another user. For example, another user that participates in the third chat window 2410 may upload the first summary information 2610 and one or more chats corresponding thereto, and in this case, the mobile terminal 100 may also display the first summary information 2610.

When a user who participates in the third chat window 2410 selects the first summary information 2610, a fourth chat window in which the user, who selects the first summary information 2610, additionally participates may be displayed.

According to an embodiment, the first summary information 2610 may be summary information generated based on chats of the first user and the second user. In this case, when a user of the mobile terminal 100 selects the first summary information 2610, the fourth chat window in which the first user, the second user, and the user of the mobile terminal 100 participate may be displayed.

According to another embodiment, the first summary information 2610 may be summary information that is generated based on chats of the user of the mobile terminal 100 and the first user. In this case, when the second user that is a user of another mobile terminal selects the first summary information, the fourth chat window in which the user of the mobile terminal 100, the first user, and the user of another mobile terminal participate may be displayed.

The artificial intelligence part 130 may display one or more chats corresponding to the first summary information on the fourth chat window.

When a new chat is performed on the fourth chat window, the artificial intelligence part 130 may update summary information.

For example, when a specific user additionally participates in the fourth chat window, the artificial intelligence part 130 may update the specific user as a keyword (a speaker of a chat).

As such, the present disclosure may provide an environment in which users interested in a specific theme easily participate in a chat on a specific theme. Accordingly, when a chat participant is added, new summary information to which the added chat participant is applied may be generated, and thus accurate information may be transferred to a user.

Figure 27:
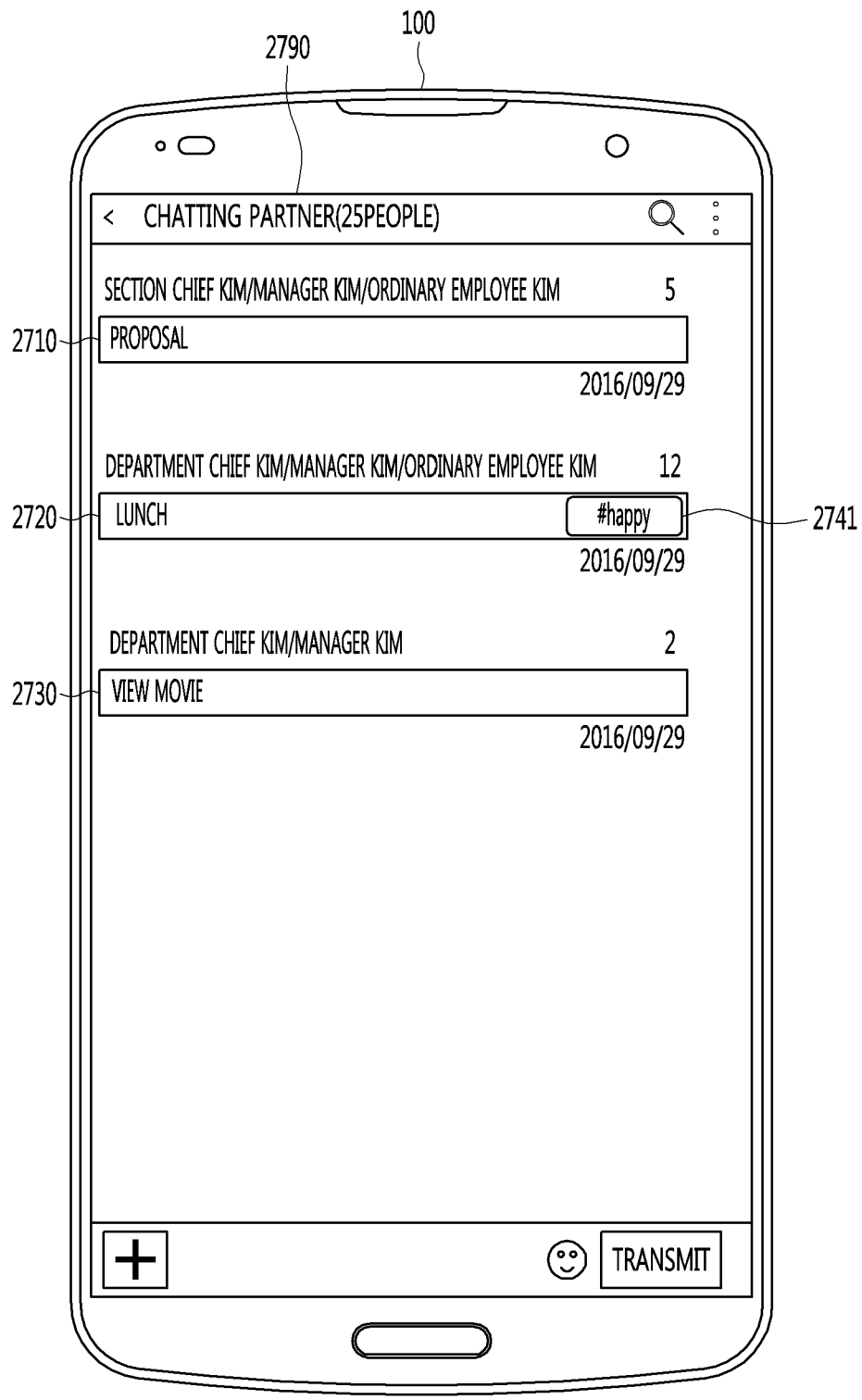
FIGS. 27 and 28 are diagrams for explaining a method of displaying summary information according to an embodiment of the present disclosure.
Figure 28:
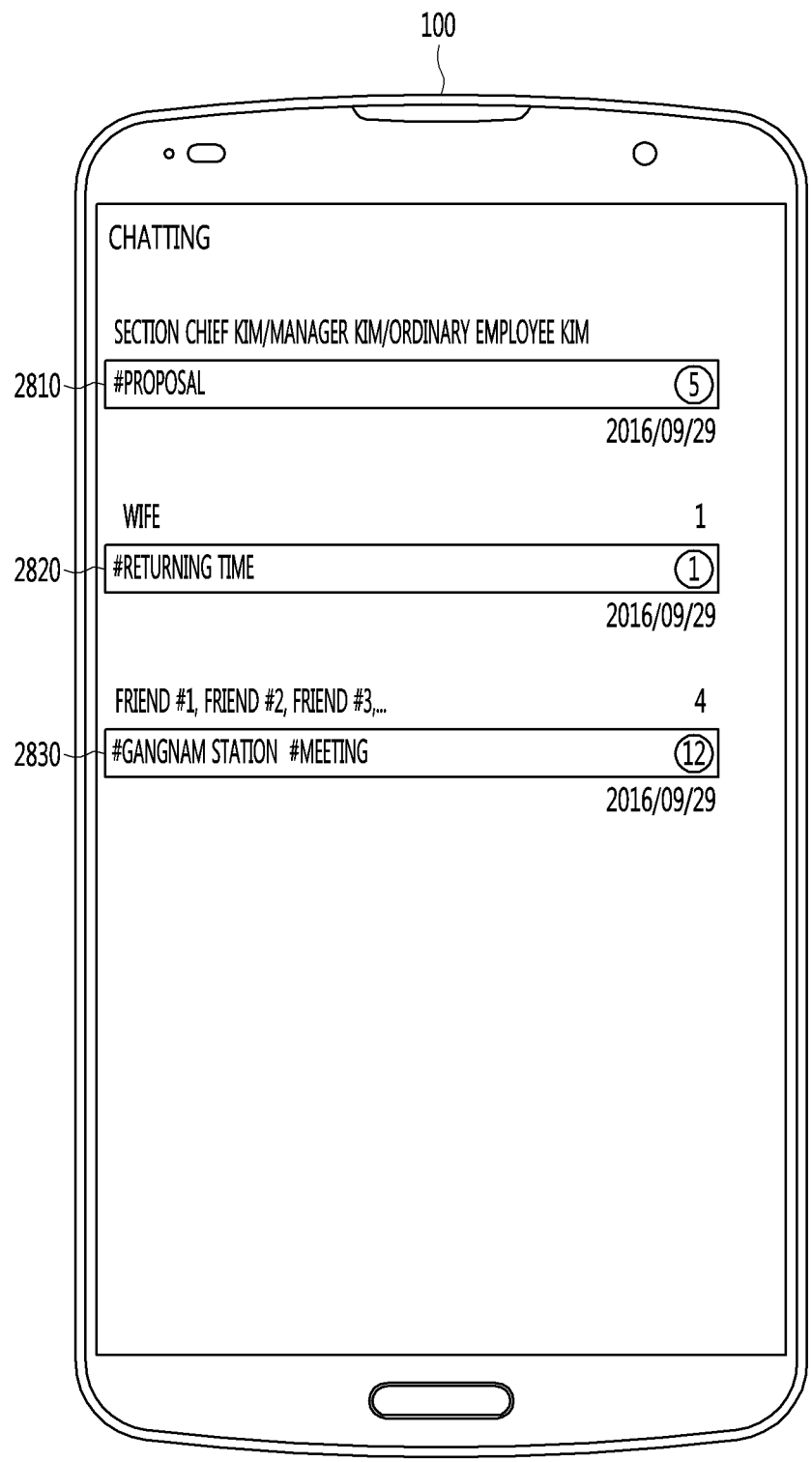

FIGS. 27 and 28 are diagrams for explaining a method of displaying summary information according to an embodiment of the present disclosure.

Referring to FIG. 27, the artificial intelligence part 130 may display one or more pieces of summary information 2710, 2720, and 2730 on a chat window 2790.

Here, all of the first summary information 2710, the second summary information 2720, and the third summary information 2730 may be generated based on a chat performed in the chat window 2790.

Referring to FIG. 28, the artificial intelligence part 130 may display one or more pieces of summary information 2810, 2820, and 2830 on a chat storing page.

In this case, the one or more pieces of summary information 2810, 2820, and 2830 may be generated based on chats performed in different chat windows.

In detail, the first summary information 2810 may be summary information corresponding to one or more chats performed in the first chat window. The second summary information 2820 may be summary information corresponding to one or more chats performed in the second chat window. In addition, the third summary information 2830 may be summary information corresponding to one or more chats performed in the third chat window.

The artificial intelligence part 130 may search for summary information based on a keyword, a chatting time, a speaker, or the like.

For example, upon receiving an input for searching for a specific keyword, the artificial intelligence part 130 may retrieve and display summary information including the specific keyword.

The artificial intelligence part 130 may receive an input for setting a tag 2741 to specific summary information. Upon receiving an input for searching for a specific tag, the artificial intelligence part 130 may retrieve and display summary information including the specific tag.

Upon receiving an input for searching for summary information in the chat window 2790, the artificial intelligence part 130 may display summary information generated by a chat performed in a chat window 2970.

Upon receiving an input for searching for summary information outside the chat window 2790, the artificial intelligence part 130 may display summary information generated by a chat performed in chat windows of a plurality of messengers or other applications.

Figure 29:
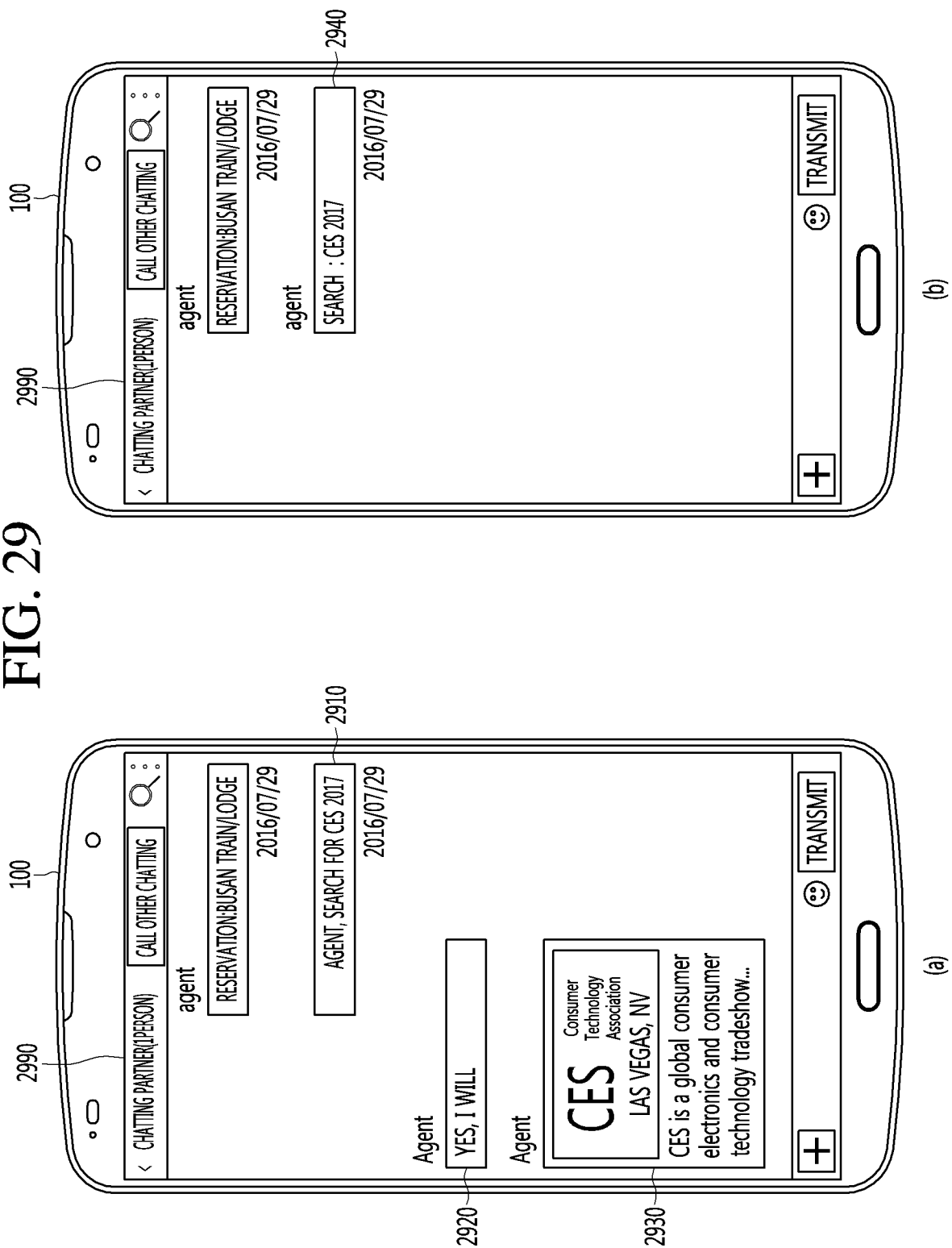
FIGS. 29 to 31 are diagrams for explaining a method of uploading a chat with an artificial intelligence agent according to an embodiment of the present disclosure.
Figure 30:
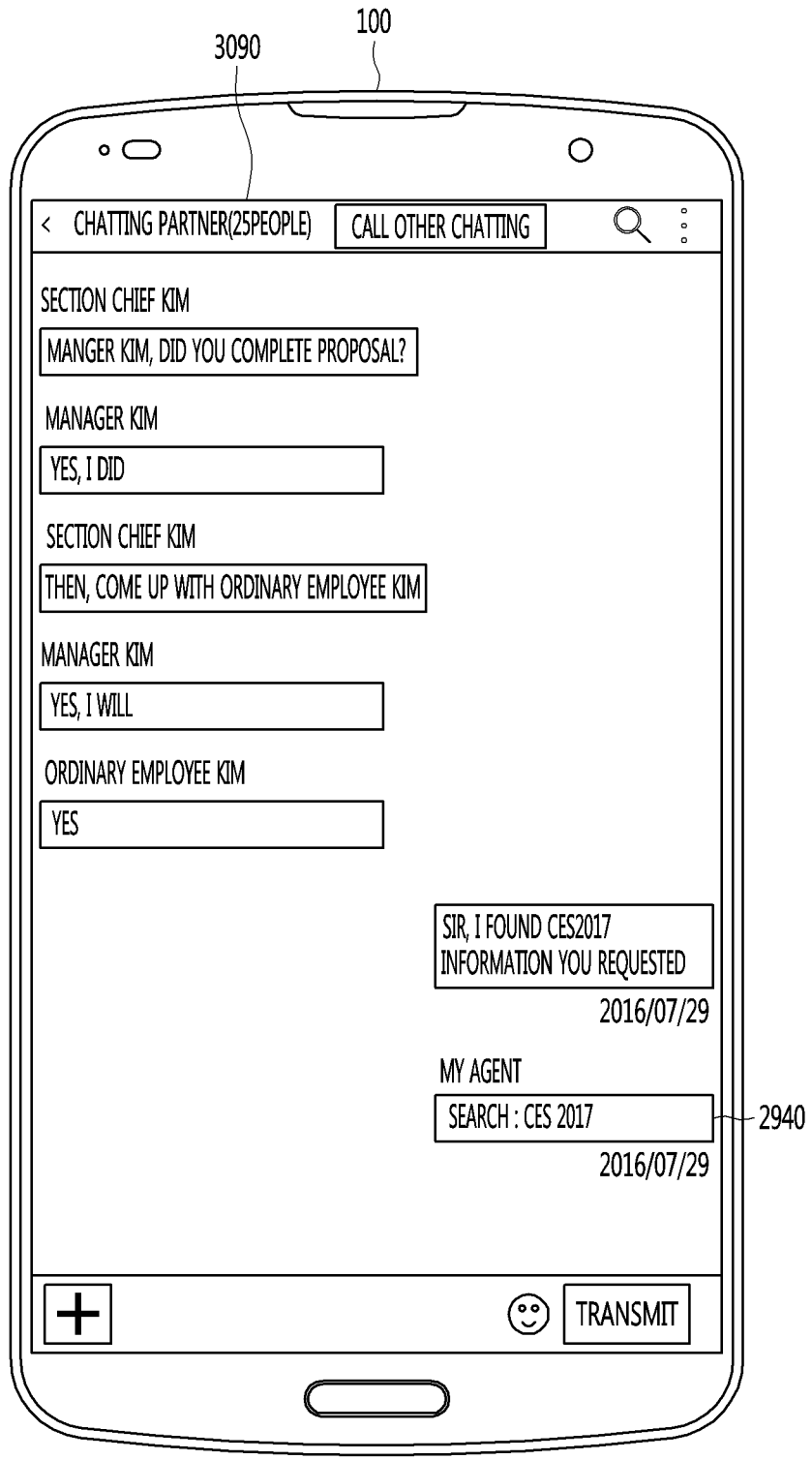
Figure 31:
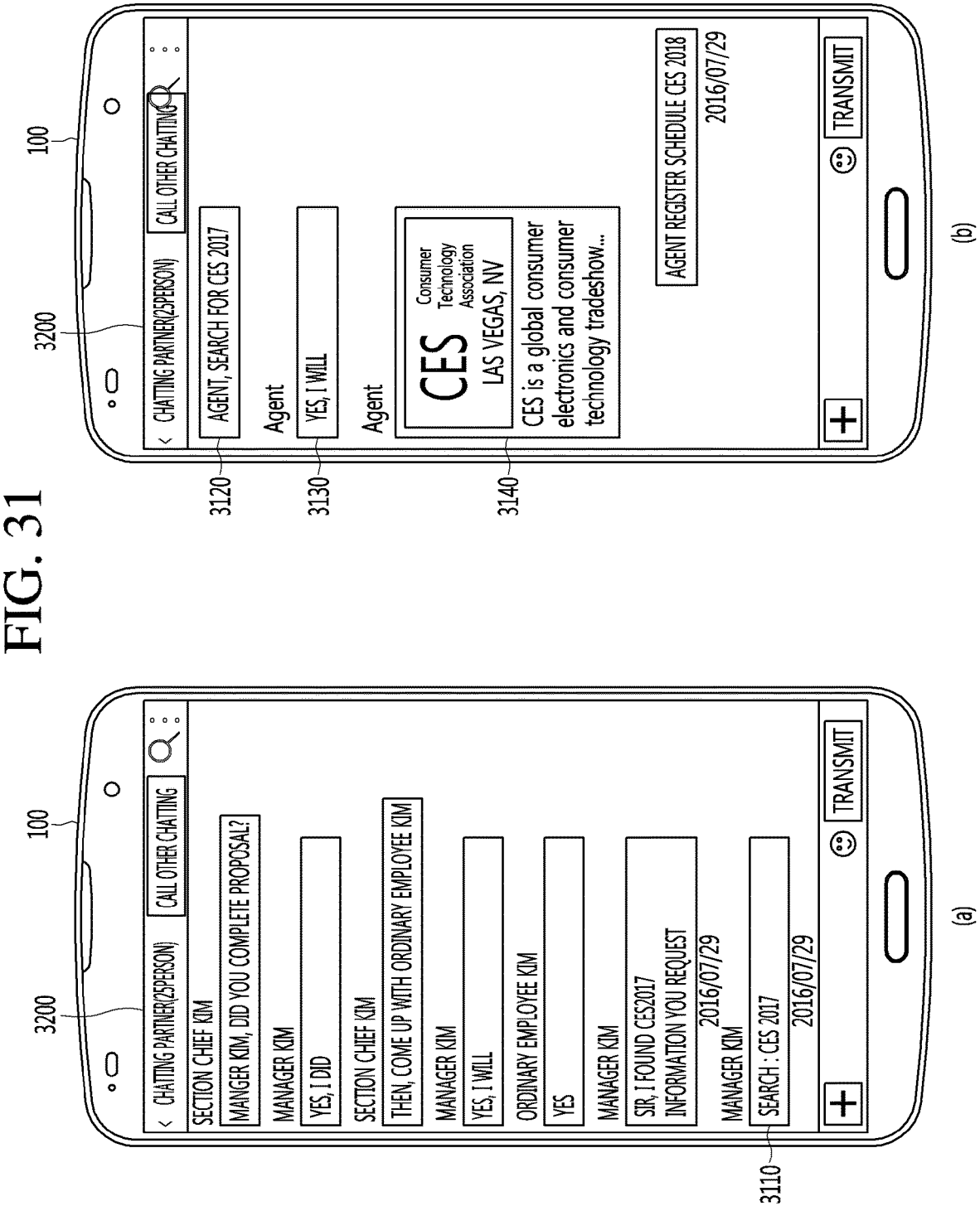

FIGS. 29 to 31 are diagrams for explaining a method of uploading a chat with an artificial intelligence agent according to an embodiment of the present disclosure.

Referring to FIG. 29, a user may chat to an artificial intelligence agent using a chat window of a messenger.

In this case, one or more chats 2910, 2920, and 2930 between a user and an artificial intelligence agent may be displayed.

The artificial intelligence part 130 may acquire a keyword from the one or more chats 2910, 2920, and 2930 between the user and the artificial intelligence agent, and may display summary information 2940 including the acquired keyword.

Referring to FIG. 30, as an input for uploading the summary information 2940 is received, the artificial intelligence part 130 may upload the summary information 2940 and one or more chats corresponding thereto to a chat window 3090. The artificial intelligence part 130 may display the summary information 2940 on the chat window 3090.

In this case, the one or more chats except for a chat made by a specific speaker may be uploaded. For example, the artificial intelligence part 130 may upload the remaining chats except for the chat made by the user of the mobile terminal 100.

FIG. 31 is a diagram showing a mobile terminal 3200 of another user that participates in the chat window 3090.

Summary information 3110 may also be displayed on the mobile terminal 3200 of another user.

Upon receiving an input for selecting the summary information 3110, the mobile terminal 3200 of another user may display one or more chats 3120, 3130, and 3140 corresponding to the summary information.

In this case, one or more chats corresponding to the summary information except for a chat made by a specific speaker may be displayed.

The mobile terminal 3200 of another user may perform a service based on one or more chats 3120, 3130, and 3140. For example, the mobile terminal 3200 of another user may store and manage information included in the one or more chats 3120, 3130, and 3140.

In general, the controller 180 may be a component responsible for control of a device and may be interchangeably used with term such as a central processing device, a microprocessor, a processor, or the like.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, etc. The computer may also include the processor 180 of a terminal. It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed:

1. A terminal comprising:
a display configured to display an image;
a controller configured to control displaying of the image; and
an artificial intelligence interface configured:
to acquire one or more chats,
to acquire one or more keywords corresponding to the one or more chats,
to control the controller to display summary information including the one or more keywords, and
to control the controller to display the one or more chats corresponding to the summary information based on selection of the summary information.

2. The terminal of claim 1, wherein the artificial intelligence interface acquires at least one of a word included in the one or more chats or a speaker as the one or more keywords; and
wherein the speaker is a speaker of at least one of the one or more chats.

3. The terminal of claim 2, wherein, when an information search request is received, the artificial intelligence interface displays one or more pieces of summary information including a keyword corresponding to the information search request among a plurality of pieces of summary information.

4. The terminal of claim 3, wherein, when an input for designating a specific keyword is received from a first speaker, the information search request is received from a second speaker different from the first speaker, and the specific keyword is included in summary information including a keyword corresponding to the information search request, the artificial intelligence interface does not display summary information including the specific keyword.

5. The terminal of claim 2, wherein, when a service providing request is received from a user, the artificial intelligence interface acquires information on a speaker who makes the service providing request, and provides a service to which preference of the speaker is applied, based on a chat of the speaker.

6. The terminal of claim 1, further comprising:
a memory configured to store the one or more chats; and
an input interface configured to receive an input from a user,
wherein, when an input for selecting first summary information is received in a state in which a plurality of pieces of summary information are displayed, the artificial intelligence interface displays one or more chats corresponding to the first summary information.

7. The terminal of claim 1, wherein, when an input for determining a specific speaker and a specific keyword is received and a service providing request related to the specific keyword is received from the specific speaker, the artificial intelligence interface blocks provision of a service corresponding to the request.

8. The terminal of claim 1, wherein the one or more chats are one or more chats classified as the same theme among a plurality of chats.

9. The terminal of claim 1, wherein the one or more chats are a chat in which one or more users participate as a speaker in a chat window of a messenger.

10. The terminal of claim 9, wherein the summary information includes at least one of the number of the one or more chats, the one or more keywords, or a chatting time of the one or more chats; and
wherein the keyword is at least one of a word included in the one or more chats or a speaker of the one or more chats.

11. The terminal of claim 9, wherein the artificial intelligence interface displays together first summary information corresponding to one or more chats performed in a first chat window and second summary information corresponding to one or more chats performed in a second chat window.

12. The terminal of claim 9, wherein, when an input for selecting the summary information, the artificial intelligence interface displays a second chat window in which a speaker of the one or more chats participates and displays the one or more chats on the second chat window.

13. The terminal of claim 12, wherein the summary information is updated by a new chat performed in the second chat window.

14. A terminal comprising:
a display configured to display an image;
a controller configured to control displaying of the image; and
an artificial intelligence interface configured to acquire one or more chats, to acquire one or more keywords corresponding to the one or more chats, and to control the controller to display summary information including the one or more keywords,
wherein the artificial intelligence interface acquires at least one of a word included in the one or more chats or a speaker as the one or more keywords,
wherein the speaker is a speaker of at least one of the one or more chats,
wherein, when an information search request is received, the artificial intelligence interface displays one or more pieces of summary information including a keyword corresponding to the information search request among a plurality of pieces of summary information.

15. A terminal comprising:
a display configured to display an image;
a controller configured to control displaying of the image; and
an artificial intelligence interface configured to acquire one or more chats, to acquire one or more keywords corresponding to the one or more chats, and to control the controller to display summary information including the one or more keywords,
wherein the one or more chats are a chat in which one or more users participate as a speaker in a chat window of a messenger,
wherein the artificial intelligence interface displays together first summary information corresponding to one or more chats performed in a first chat window and second summary information corresponding to one or more chats performed in a second chat window.

* * * * *